United States Patent
Dixon et al.

(10) Patent No.: US 8,856,024 B2
(45) Date of Patent: Oct. 7, 2014

(54) DETERMINING COMPANION AND JOINT CARDS IN TRANSIT

(75) Inventors: Phillip B. Dixon, San Diego, CA (US); David Lapczynski, Tullahoma, TN (US)

(73) Assignee: Cubic Corporation, San Diego, CA (US)

(*) Notice: Subject to any disclaimer, the term of this patent is extended or adjusted under 35 U.S.C. 154(b) by 124 days.

(21) Appl. No.: 13/281,272

(22) Filed: Oct. 25, 2011

(65) Prior Publication Data

US 2012/0278137 A1     Nov. 1, 2012

Related U.S. Application Data

(60) Provisional application No. 61/406,821, filed on Oct. 26, 2010.

(51) Int. Cl.

| | |
|---|---|
| *G07B 15/00* | (2011.01) |
| *G06Q 20/00* | (2012.01) |
| *G06Q 20/40* | (2012.01) |
| *G06Q 20/34* | (2012.01) |
| *G06Q 20/32* | (2012.01) |

(52) U.S. Cl.
CPC ............ *G06Q 20/4016* (2013.01); *G07B 15/00* (2013.01); *G06Q 20/343* (2013.01); *G06Q 20/322* (2013.01)
USPC .............................................. 705/13; 705/75

(58) Field of Classification Search
CPC . G07B 15/00; G06Q 20/4016; G06Q 20/343; G06Q 20/322
USPC ..................................................... 705/13, 75
See application file for complete search history.

(56) References Cited

U.S. PATENT DOCUMENTS

| | | | |
|---|---|---|---|
| 5,530,232 A | 6/1996 | Taylor | |
| 5,627,355 A * | 5/1997 | Rahman et al. | ............... 235/380 |

(Continued)

FOREIGN PATENT DOCUMENTS

| | | |
|---|---|---|
| EP | 666549 A1 | 8/1995 |
| EP | 1431891 A1 | 6/2004 |

(Continued)

OTHER PUBLICATIONS

U.S. Appl. No. 12/877,691, filed Sep. 8, 2010, Office Action dated Feb. 7, 2013, 13 pages.

(Continued)

*Primary Examiner* — Kevin Flynn
(74) *Attorney, Agent, or Firm* — Kilpatrick Townsend & Stockton LLP

(57) ABSTRACT

Embodiments of systems, methods, and machine-readable media are disclosed for detecting potential misuse of a primary account number (PAN) associated with a first handheld media in a transit system having one or more access points. Embodiments may creating a user account and include enrolling the first handheld media for use as a fare media for a transit product, where the PAN is stored in the user account. Embodiments may further include receiving, a plurality of fare transaction records. Each fare transaction record may include the PAN associated with the first handheld media and a transaction identifier. Embodiments may additionally include determining a potential misuse of a handheld media associated with the PAN based, at least in part, on the relationship between a plurality of the transaction identifiers. In response, an action may be taken related to using the first handheld media as a fare media for the transit product.

8 Claims, 15 Drawing Sheets

(56) References Cited

U.S. PATENT DOCUMENTS

| | | | |
|---|---|---|---|
| 6,018,717 | A | 1/2000 | Lee et al. |
| 6,070,141 | A * | 5/2000 | Houvener et al. ............... 705/76 |
| 6,259,769 | B1 | 7/2001 | Page et al. |
| 6,726,100 | B2 | 4/2004 | Lauper et al. |
| 6,736,322 | B2 | 5/2004 | Gobburu et al. |
| 6,913,193 | B1 | 7/2005 | Kawan |
| 7,306,143 | B2 | 12/2007 | Bonneau, Jr. et al. |
| 7,417,306 | B1 | 8/2008 | Jacobsen et al. |
| 7,562,818 | B1 | 7/2009 | Bierbaum et al. |
| 7,664,676 | B2 | 2/2010 | Van Do et al. |
| 7,886,974 | B2 | 2/2011 | Abbiss et al. |
| 7,991,694 | B2 | 8/2011 | Takayama |
| 8,118,223 | B2 | 2/2012 | Hammad et al. |
| 8,306,512 | B2 | 11/2012 | Dixon et al. |
| 2001/0011255 | A1 * | 8/2001 | Asay et al. ....................... 705/76 |
| 2001/0018660 | A1 | 8/2001 | Sehr |
| 2002/0043566 | A1 * | 4/2002 | Goodman et al. ............ 235/492 |
| 2002/0170962 | A1 | 11/2002 | Besling et al. |
| 2003/0046249 | A1 | 3/2003 | Wu |
| 2003/0085272 | A1 | 5/2003 | Andrews et al. |
| 2004/0056087 | A1 | 3/2004 | Bonneau, Jr. et al. |
| 2004/0177045 | A1 | 9/2004 | Brown |
| 2004/0230535 | A1 | 11/2004 | Binder et al. |
| 2005/0070257 | A1 | 3/2005 | Saarinen et al. |
| 2005/0278216 | A1 | 12/2005 | Graves |
| 2006/0064379 | A1 | 3/2006 | Doran et al. |
| 2006/0179003 | A1 | 8/2006 | Steele et al. |
| 2006/0218038 | A1 | 9/2006 | Grider |
| 2006/0237528 | A1 * | 10/2006 | Bishop et al. ................. 235/380 |
| 2008/0033880 | A1 | 2/2008 | Fiebiger et al. |
| 2008/0051059 | A1 | 2/2008 | Fisher |
| 2008/0051122 | A1 | 2/2008 | Fisher |
| 2008/0052192 | A1 | 2/2008 | Fisher |
| 2008/0052233 | A1 | 2/2008 | Fisher et al. |
| 2008/0116264 | A1 | 5/2008 | Hammad et al. |
| 2008/0126251 | A1 | 5/2008 | Wassingbo |
| 2008/0128513 | A1 | 6/2008 | Hammad et al. |
| 2008/0179394 | A1 * | 7/2008 | Dixon et al. .................. 235/380 |
| 2008/0183589 | A1 | 7/2008 | Dixon et al. |
| 2008/0195428 | A1 | 8/2008 | O'Sullivan |
| 2008/0201212 | A1 | 8/2008 | Hammad et al. |
| 2008/0203151 | A1 | 8/2008 | Dixon et al. |
| 2008/0203156 | A1 | 8/2008 | Liu et al. |
| 2008/0208681 | A1 | 8/2008 | Hammad et al. |
| 2008/0255890 | A1 | 10/2008 | Hilliard |
| 2008/0319901 | A1 * | 12/2008 | Brown ............................ 705/41 |
| 2009/0055893 | A1 * | 2/2009 | Manessis et al. ................ 726/2 |
| 2009/0060393 | A1 | 3/2009 | Satoh |
| 2009/0072024 | A1 | 3/2009 | Bonneau, Jr. et al. |
| 2009/0103730 | A1 | 4/2009 | Ward et al. |
| 2009/0106116 | A1 | 4/2009 | Zingsheim |
| 2009/0124234 | A1 | 5/2009 | Fisher et al. |
| 2009/0132362 | A1 | 5/2009 | Fisher et al. |
| 2009/0144161 | A1 | 6/2009 | Fisher |
| 2009/0156190 | A1 | 6/2009 | Fisher |
| 2009/0171682 | A1 | 7/2009 | Dixon et al. |
| 2009/0184163 | A1 | 7/2009 | Hammad et al. |
| 2009/0255996 | A1 | 10/2009 | Brown et al. |
| 2009/0265260 | A1 | 10/2009 | Aabye et al. |
| 2009/0271211 | A1 | 10/2009 | Hammad |
| 2010/0089995 | A1 | 4/2010 | El-Awady et al. |
| 2010/0188195 | A1 | 7/2010 | Busch-Sorensen |
| 2010/0224682 | A1 | 9/2010 | Busch-Sorensen |
| 2010/0312605 | A1 | 12/2010 | Mitchell et al. |
| 2011/0165836 | A1 | 7/2011 | Dixon et al. |
| 2011/0165866 | A1 | 7/2011 | Dixon et al. |
| 2011/0166914 | A1 | 7/2011 | Dixon et al. |
| 2011/0166936 | A1 | 7/2011 | Dixon et al. |
| 2011/0166997 | A1 | 7/2011 | Dixon et al. |
| 2011/0220718 | A1 | 9/2011 | Dixon et al. |
| 2012/0101927 | A1 * | 4/2012 | Leibon et al. .................... 705/35 |
| 2013/0066689 | A1 | 3/2013 | Dixon et al. |

FOREIGN PATENT DOCUMENTS

| | | |
|---|---|---|
| KR | 10-0467260 B1 | 1/2005 |
| KR | 10-0823210 B1 | 4/2008 |
| WO | 97/10560 A1 | 3/1997 |
| WO | 2005/013169 A1 | 2/2005 |
| WO | 2006/124808 A2 | 11/2006 |
| WO | 2008/039796 A2 | 4/2008 |
| WO | 2008/070642 A2 | 6/2008 |
| WO | 2009/060393 A2 | 5/2009 |

OTHER PUBLICATIONS

"A Pre-Authorised National Payment Card has been launched in Kazakhstan", Open Way Payment Processing Solutions, dated Feb. 12, 2005, found online at http://www.openwaygroup.com/news_card.jsp?dcion=350&rgn=1&lng=1, 3 pages.

"EMV '96 Integrated Circuit Card Application Specification for Payment Systems", Internet Citation, 1996, retrieved on Dec. 29, 2005 from internet at http://www.ttfn.net/techno/smartcards/applspec.pdf, pp. 23-31.

"TCRP Report 32: Multipurpose Transit Payment Media", Transit Cooperative Research Program, Transportation Research Board, National Research Council, National Academy Press, Washington, D.C., 1998, 140 pages.

Mastercard Worldwide, "An Introduction to Chip: For Issuers and Acquirers", 2007, 52 pages.

Mosaic Software's Postilion Supports MasterCard's OneSMART Pre-Authorized Solution, Press Release, Bob's Guide, Nov. 2, 2004, 2 pages.

PCT International Search Report and Written Opinion mailed Aug. 18, 2010; International Application No. PCT/US2010/041621, 7 pages.

PCT International Search Report and Written Opinion mailed Oct. 22, 2010; International Application No. PCT/US2010/041625, 8 pages.

PCT International Search Report and Written Opinion mailed Sep. 23, 2010; International Application No. PCT/US2010/041624, 9 pages.

PCT International Search Report and Written Opinion mailed Sep. 7, 2010; International Application No. PCT/US2010/041622, 8 pages.

PCT International Search Report and Written Opinion of PCT/US2010/041623 mailed on Feb. 8, 2012, 7 pages.

* cited by examiner

DETERMINING COMPANION AND JOINT CARDS IN TRANSIT

This application claims priority to Provisional U.S. Patent Application No. 61/406,821 filed Oct. 26, 2010, entitled "Determining Companion and Joint Cards in Transit," of which the entire disclosure is hereby incorporated by reference for all purposes.

CROSS-REFERENCES TO RELATED APPLICATIONS

The present application is also related to U.S. patent application Ser. No. 12/877,691, filed on Sep. 8, 2010, entitled "Association of Contactless Payment Card Primary Account Number," which is incorporated herein by reference for all purposes.

BACKGROUND

As transit systems throughout the world continue to mature, so do the technologies that support them. Many transit systems use impersonalized fare media that carry a value, such as stored-value cards, but other transit systems are taking a more personalized, account-based approach. Account-based transit systems can provide transit users with a personalized account, which can store product and funding information. Because value is associated with an account rather than a fare media, a transit system can disable a lost or stolen fare media and issue a new fare media to a transit user without the loss of any value to either the transit user or the transit system.

Because fare media does not store a value in these account-based transit systems, items other than those issued by a transit system may be enabled for use as fare media. Payment cards, for example, can be configured for use in such account-based transit systems. For transit systems utilizing wireless, or contactless, technology, contactless payment cards may be used. Occasionally, this process may be not be straight forward if multiple fare media become associated with the same primary account number, or if multiple users use the same fare media to access a transit product meant to be used by a single person.

BRIEF SUMMARY

Embodiments of methods and machines are disclosed for detecting potential misuse of handheld media, such as contactless payment cards and/or other devices having near-field communication (NFC) capabilities, for use as fare media in a transit and/or transportation system. Embodiments include reading contactless data from a contactless device and associating it with information received from another source on the device. For example, associating a primary account number (PAN) and/or other information received from a contactless payment card's contactless interface with a PAN obtained from a magnetic stripe of the contactless payment card. The information can then be further associated with one or more products and/or a transit user account. A plurality of transaction identifiers may be collected from fare transactions at the transit station's access control points, and potential misuse of the PAN and/or handheld media may be determined, at least in part, by analyzing the relationship between a plurality of the transaction identifiers.

An example method for detecting potential misuse of a primary account number associated with a handheld media in a transit system having one or more access points, according to the description, may include creating a user account for managing transactional information, where the user account includes at least one transit product. The method may also include enrolling the handheld media for use as fare media for at least one of the transit products, where the PAN is stored in the user account. A plurality of fare transaction records are received from one or more access points of the transit system, and each fare transaction record may include the PAN associated with the handheld media and a transaction counter. The method may additionally include determining that a potential misuse of a handheld media associated with the PAN has occurred. The determination may be based, at least in part, on a sequence of the transaction counters from the fare transaction records. Finally, the method includes taking an action related to using the handheld media as fare media for the transit product.

The example method for detecting potential misuse of a PAN associated with a handheld media may include one or more of the following features. The handheld media may be a smart card having near-field communication capabilities, and the transaction counter may increment at least every time the handheld media is used at the access points and may be stored on the handheld media. The potential misuse may be determined by identifying gaps in the sequence of the plurality of transaction counters. The potential misuse may also be determined by determining that the sequence of transaction counters is not ascending. The potential misuse may also be determined by comparing the sequence of transaction counters to a user profile and identifying deviations. Additionally, each fare transaction record may also include a transaction time and a transaction location, and the potential misuse may also be determined, at least in part, on a pattern of the transaction times and locations from the fare transaction records.

Another example method for detecting potential misuse of a primary account number associated with a handheld media in a transit system having one or more access points, according to the description, may include creating a user account for managing transactional information, where the user account includes at least one transit product. The method may also include enrolling the handheld media for use as fare media for at least one of the transit products, where the PAN is stored in the user account. A plurality of fare transaction records are received from one or more access points of the transit system, and each fare transaction record may include the PAN associated with the handheld media and a transaction time and location. The method may additionally include determining that a potential misuse of a handheld media associated with the PAN has occurred. The determination may be based, at least in part, on a pattern of the transaction times and locations from the fare transaction records. Finally, the method may also include taking an action related to using the handheld media as fare media for the transit product.

The example method for detecting potential misuse of a primary account number associated with a handheld media may include one or more of the following features. The potential misuse may be determined by indentifying multiple fare transactions that take place within a predetermined time window. The potential misuse may also be determined by indentifying fare transactions at distant locations that occur within a predetermined time window. The potential misuse may also be determined by indentifying first and second fare transactions where travel time between the locations exceeds a difference between the transaction times of the transactions. The potential misuse may also determined by comparing the pattern of the transaction times and locations to a user profile and identifying deviations. Finally, each transaction record may also include a plurality of transaction counters, and the potential misuse may also be determined, at least in part, on a sequence of the transaction counters.

An example server for detecting potential misuse of a PAN associated with a handheld media in a transit system, according to the description may include a network interface configured to communicate with a network, an input interface configured to receive information from one or more of the access points of the transit system, and a processor communicatively coupled with the network interface, the input interface, and a memory. The memory may contain instructions that cause the server to create a user account for managing transactional information in the memory. The user account may include a transit product, and a handheld media may be enrolled for use as fare media for the transit product. The PAN may be stored in the user account. The memory also may contain instructions that cause the server to receive, from the input interface, a plurality of fare transaction records, where each fare transaction record includes the PAN associated with the handheld media and a transaction identifier. The memory may also contain instructions that cause the server to determine potential misuse of a handheld media associated with the PAN based, at least in part, on a relationship between some of the transaction identifiers from the fare transaction records. Finally, the memory may also contain instructions that cause the server to take an action related to using the handheld media as fare media for using the transit product.

The example server for detecting potential misuse of a PAN associated with a handheld media in a transit system may include one or more of the following features. Each transaction identifier may include a transaction counter, and the potential misuse may be determined, at least in part, on a sequence of the transaction counters. Each transaction identifier may include a transaction time and location, and the potential misuse may be determined, at least in part, on a pattern of the transaction times and locations. The action related to using the handheld media as fare media for using the transit product may include denying future use as fare media of any handheld media associated with the PAN. The action related to using the handheld media as fare media for using the transit product may also include charging the user account a fee for one or more of the fare transaction records. Finally, the server may also include an output interface configured to send notifications associated with potential misuse of the handheld media associated with the PAN, and the action related to using the handheld media as fare media for using the transit product comprises sending, from the output interface, a notification regarding the potential misuse of the handheld media associated with the PAN.

DETAILED DESCRIPTION

Figure 1:
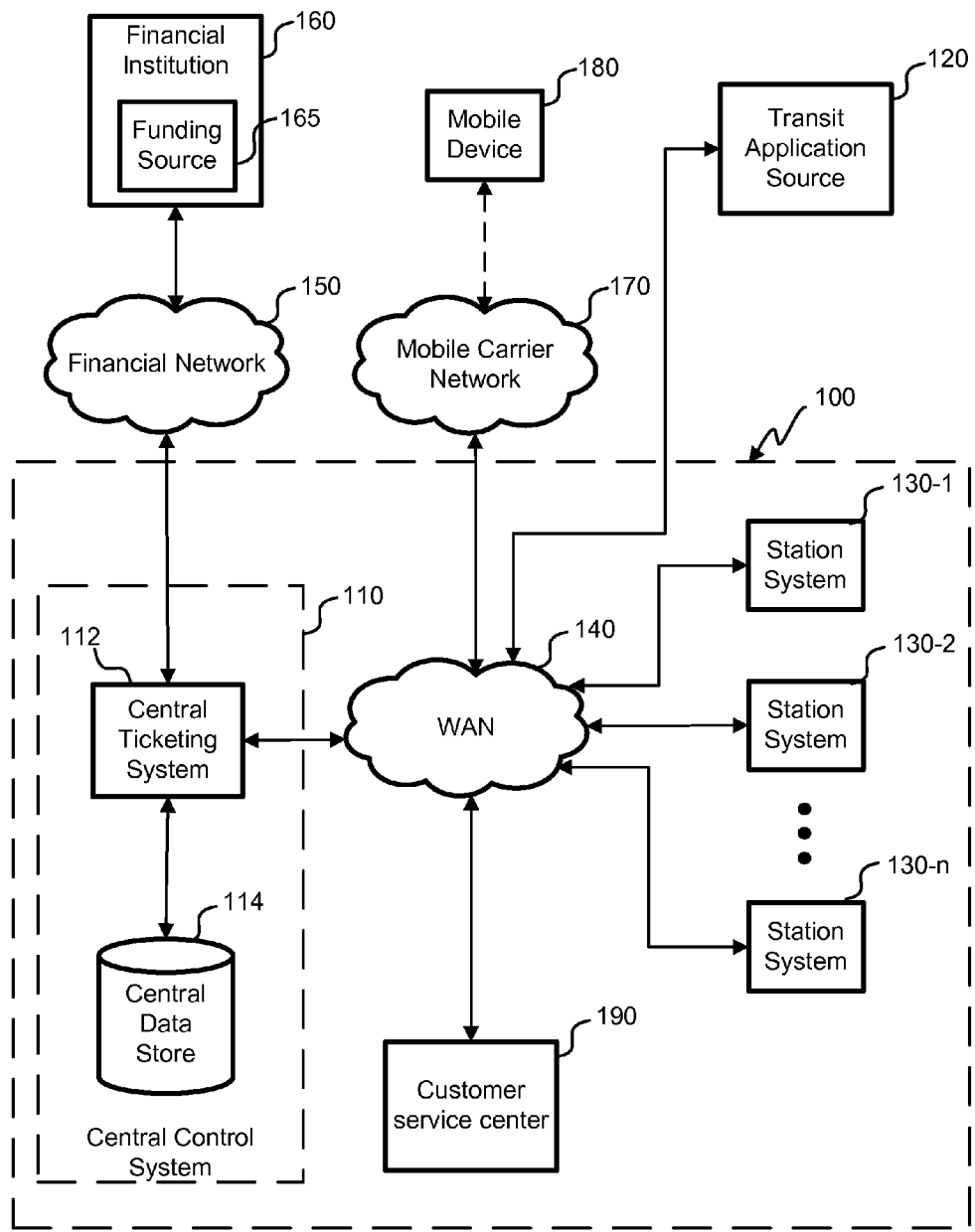
FIG. 1 is a block diagram of an embodiment of a transit system providing transit user accounts for management of transactions of a user of the transit system.

In the following description, for the purposes of explanation, numerous specific details are set forth in order to provide a thorough understanding of various embodiments. It will be apparent, however, to one skilled in the art that various embodiments may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosed systems and methods as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The term "payment brand" as used herein includes, but is not limited to payment card networks, such as VISA®, MASTERCARD®, AMERICAN EXPRESS®, and DISCOVER®. These networks may issue payment cards, such as reloadable prepaid cards, directly or though a separate card issuer, such as an authorized issuing bank. Furthermore, payment-branded cards as described herein may be "co-branded," meaning that the cards may be accepted, issued, and/or authorized by a transit agency or other entity in addition to a bank and/or payment brand.

Account-based transit systems are uncommon among current transit systems. Because transit systems require quick transactions, it is easier to use stored-value fare media (e.g., fare media, such as a transit fare card, that can store a value and a trip history on the card). However, encoding the value or transit product onto a fare media, rather than associate the value or fare media to a transit user, has its limitations. If the fare media is lost or stolen, it is difficult to remove the value from the lost or stolen fare media and restore it to a transit user. On the other hand, an account-based transit system can enable a transit user to enroll a variety of items as fare media. The fare media can be disabled if lost or stolen, without any lost value to the account. And the account may be linked to a funding source to conveniently increase the account value and purchase additional products.

FIG. 1 illustrates a block diagram of an embodiment of a transit system 100, in communication with other systems, providing transit user accounts for management of transactions of users of the transit system 100. The transit system can include various forms of transit, including subway, bus, ferry commuter rail, para-transit, etc., or any combination thereof. The transit user account can comprise information regarding a certain user of the transit system 100, such as a name, address, phone number, email address, user identification (such as a unique identifier of the user or other user ID), passcode (such as a password and/or personal identification number (PIN)), an identification code associated with a fare media used to identify a user and/or a transit user account (such as a primary account number (PAN)), information regarding user preferences and user opt-in or opt-out selections for various services, product(s) associated with the transit user account, a value and/or credit associated with the product(s), information regarding a funding source 165 for the transit user account, and more. The transit user account can further comprise funding and transaction information, such as product information, a funding source, and a payment amount. A transit user may request a transit user account and provide the information listed above by phone (such as a call to a customer service center 190 maintained and/or provided by the transit service provider of the transit system 100), on the Internet, at ticket booth, at a ticket venting machine, or by other means. A central ticketing system 112, which can comprise of one or more servers and/or other computing systems having processors, memories, and network interfaces for processing and communicating information. The central ticketing system 112 can use the information provided by the user to create the transit user account, which can be stored and/or maintained on a database, such as a central data store 114 of a central control system 110. It will be recognized that such a transit system 100 can be enabled for use in applications beyond transit, such as transportation systems (e.g., airline systems, car rental systems, etc.).

A funding source 165 for a transit user account can provide funding to purchase products of the transit services system. It can be external to the central control system 110 and maintained, for example, by a financial institution 160. Such a funding source 165 may include a savings or checking account, a prepaid account, a credit account, an e-commerce account (such as a PAYPAL® account), or more, which can transfer funds via automated clearing house (ACH) or other means. If a transit user account comprises information regarding a funding source 165 for the account, the central ticketing system 112 can use the information to fund purchases or other transactions of a user of the transit system 100. These transactions can be made at stations, on the Internet, by phone, text, email, or a variety of other different ways, and transaction information can then be sent to the central ticketing system 112 to update the transit user account associated with the transactions and reconcile payments and purchases with the funding source 165. The central ticketing system 112 can communicate with the financial institution 160 (or other entity maintaining the funding source 165) through a financial network 150.

The central ticketing system's reconciliation with a funding source 165 may vary depending on one or more products associated with the transit user account and the functionality desired by a transit services provider. For example, the transit user account may include a running balance mirroring a balance of the funding source 165. In such a case, transactions, such as passage of a user at an access control point (such as a turnstile, faregate, platform validator, para-transit vehicle, bus, conductor handheld unit, or fare box at a entry, exit, or other location of a transit station) can be recorded and/or tracked by the central ticketing system 112 and reconciled, on a per-transaction basis and/or collectively with other transactions. Along these lines, the central ticketing system 112 may reconcile payment for the transactions with the funding source 165 as the transactions are received and/or on a scheduled basis, such as on an hourly or daily basis.

Additionally or alternatively, when transit products or services are associated with a transit user account, the central ticketing system 112 can draw funds from a funding source 165 less frequently. For example, a transit product can include a certain number of rides or an unlimited number of rides for a certain period of time. In this case, the central ticketing system 112 can track transactions associated with the passage of a user at an access control point (i.e., transactions in the transit system associated with a ride), but may only need to reconcile with the funding source 165 once, for the purchase of the transit product.

The transit user account may further include information regarding a user's preferences with regard to funding. For example, the transit user account may be configured to automatically draw a certain amount of funds from the funding source 165 each month to pay for a certain transit product or service, or to add value and/or credits to an existing transit product or service. The value and/or credits can include a monetary credit, a usage credit, and/or a usage period. Additionally or alternatively, the transit user account can be configured to automatically withdraw a certain amount of funds from the funding source 165 to add additional value and/or credits to an existing product when the value and/or credits of the existing product drops below a certain threshold level. Various other configurations are allowable by the transit user account. It will be understood that other systems of the transit system 100, such as a station system 130, may draw funds from a funding source 165. Moreover, because cash payments can also be used to fund transactions associated with a transit user account, the transit user account may not require funding source 165.

Transactions of a user, such as passage at a transit access control points, can frequently occur at stations of the transit system 100, although it will be understood that access control points can exist elsewhere, such as on busses or trains. Station systems 130 can gather information regarding transactions and communicate the information to the central ticketing system 112 using a wide area network (WAN) 140. The WAN 140 can include one or more networks, such as the Internet, that may be public, private, or a combination of both. The WAN 140 could be packet-switched or circuit-switched connections using telephone lines, coaxial cable, optical fiber, wireless communication, satellite links, and/or other mechanisms for communication. Communication between the station systems 130 and the central control system 110 may be in real time or periodic. Thus, the usage of fare media throughout the transit system 100 can be tracked.

In this embodiment, a central ticketing system 112 and a central data store 114 are shown for the central control system 110. As discussed above, central ticketing system 112 receives periodic reports upon how credits or debits are being processed throughout the transit system 100. Additionally, changes in schedules, ticket prices, and delay notifications can be communicated from the central ticketing system 112 to the station systems 130 via the WAN 140.

A mobile device 180 may be communicatively coupled with the central control system 110. Such a mobile device may be a smart phone or other mobile phone (including a near-field-communication (NFC)-enabled mobile phone), a tablet personal computer (PC), a personal digital assistant (PDA), an e-book reader, or other device. In transit system 100, a communicative link from mobile device 180 to central ticketing system 112 can be provided by a mobile carrier network 170 in communication with WAN 140. Mobile device 180 can thereby communicate with the central ticketing system 112 to access and/or manage information of a transit user account. Furthermore, the central ticketing system 112 can send messages to the mobile device 180, providing transit, account, and/or advertisement information to a user of the transit system 100 in possession of the mobile device 180. Such messages may be based on, among other things, opt-in or opt-out selections and/or other user preferences as stored in a transit user account.

A transit user can use mobile device 180 to download a transit application from a transit application source 120. The transit application source 120 may be an application store or website provided by a mobile carrier, the hardware and/or software provider of the mobile device 180, and/or the transit service provider. The transit application can be uploaded or otherwise provided to transit application source 120 by the transit service provider. According to some embodiments, the transit application can provide additional functionality of mobile device 180, including enabling an NFC-enabled mobile device to be used as fare media and access control points of the transit system 100.

Figure 2:
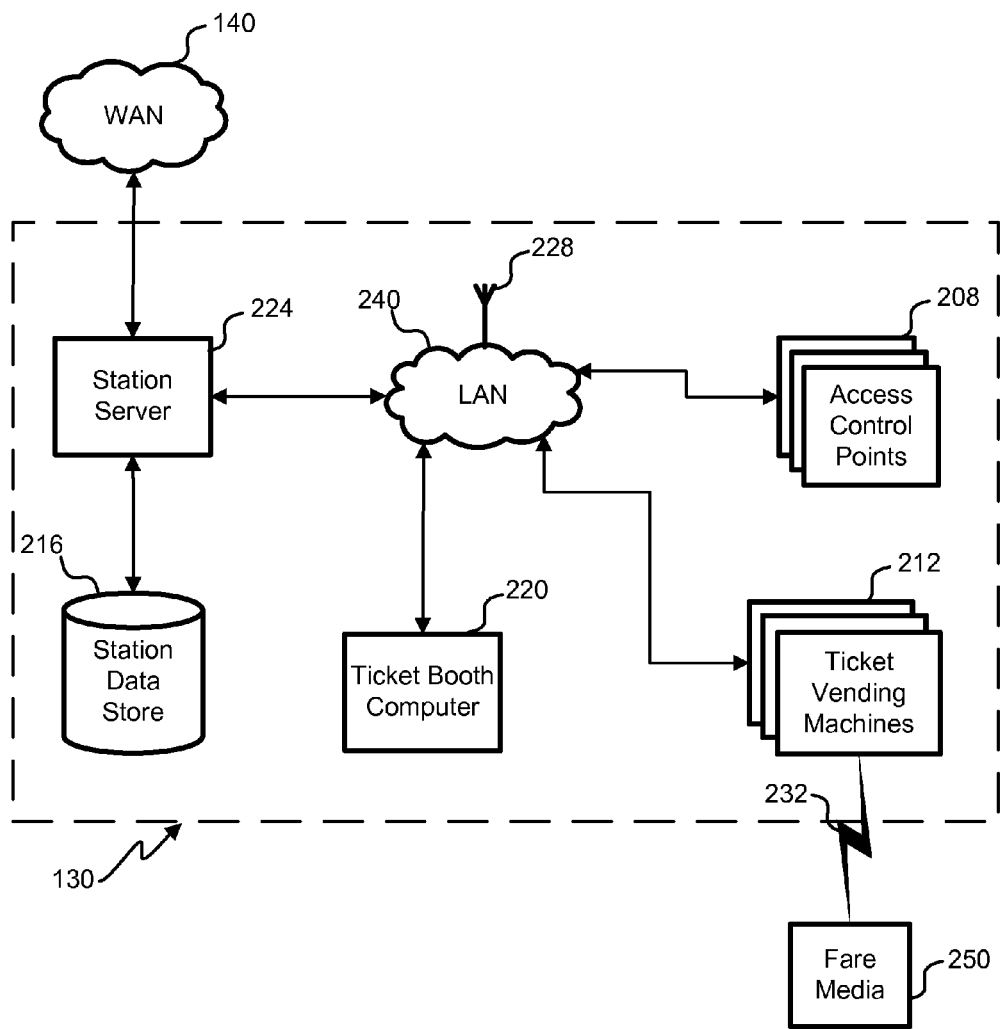
FIG. 2 is a block diagram of an embodiment of a transit station system.

FIG. 2 shows a block diagram of an embodiment of a transit station system 130. As discussed above, transit system 100 can include various forms of transit, such as subway, bus, ferry, commuter rail, para-transit, and more. Because different forms of transit may require different functionality, various transit station systems 130 may have some or all of the components shown in the block diagram. A local area network (LAN) 240 couples the various systems together and could include point-to-point connections, packet switched connections, wireless connections, and/or other networking techniques.

A station server 224 can be coupled to the WAN 140 to allow communication with the central ticketing system 112. Processing of local information can be performed on the station computer server 224. For example, fare information, schedule information, delay update information, and other transit related information can be processed at the station server 224 and communicated to the various other machines in the transit system 100.

A ticket booth computer 220, access control points 208, and transit vending machines (TVMs) 212 can communicate with the central ticketing system 112 through the station computer server 224 or directly with the central ticketing system 112 through LAN 240 or WAN 140 (e.g., the Internet). According to some embodiments, access control points 208 collect information from a user at various locations in the transit station system 130, and can come in various forms such as turnstiles, faregates, platform validators, para-transit vehicles, busses, conductor handheld units, and/or fare boxes. The access control points 208 can communicate with the station server 224 and/or central ticketing system 112 to determine whether to grant a user access when fare media has been presented at the access control points 208. If access control points communicate with a station server 224 during such transactions, identification codes of fare media, which can be used to link a transaction with a transit user account, may be stored on lists in the station data store 216. Additionally, "hotlists", or lists of information identifying users, handheld media, PAN's, and/or user accounts may be stored on these lists. These lists can be updated on a regular basis to reflect other transactions of the fare media throughout the transit system 100. In other embodiments, identification codes of fare media 250 are stored at access control points 208.

Access control points 208 of the transit system 100 can be configured to read information from one or more sources of information on a fare media 250. To do so, access control points 208 can employ one or more technologies, such as WIFI, BLUETOOTH®, barcode and/or other optical scanning Access control points 208 may also employ near-field communication (NFC) technologies to read information from RFID tags, NFC-enabled mobile devices (such as certain personal digital assistants (PDAs), mobile phones, and other portable and/or personal electronics), contactless payment cards, and other contactless devices. The access control points 208 may also be configured to record, store, and/or transmit data regarding characteristics of the fare transactions, or transaction identifiers.

The access control points 208, TVMs 212, and one or more ticket booth computers 220, can communicate with the station server 224 via the LAN 204. This communication can be transmitted via a physical connection or wireless connection via one or more antennas 228. Transactions at access control points 208, TVMs 212, and one or more ticket booth computers 220 can be communicated to the station server 224, stored at station data store 216, and/or transmitted to central ticketing system, which can update information in a transit user account accordingly.

Various portable and/or handheld media with a unique identifier can be used as fare media, whether or not the media is issued by a transit services provider. Such media can include identification cards, payment cards, personal electronic devices, bar codes and items having bar codes, contactless devices, and more. Contactless devices can include media having a unique identification code readable by access control points 208 though NFC signals (e.g., radio frequency (RF) signals). By way of example, but not by limitation, such contactless devices can include devices comprising RFID tags and/or RFID-tagged items, contactless payment cards (including but not limited to credit cards, prepaid cards, debit cards, or other bank cards or contactless smart cards.), contactless identification cards and/or fobs, and NFC-enabled mobile devices.

Fare media 250 can have multiple sources of information, which may be read automatically by certain systems and devices in the transit system 100, depending on desired functionality. For contactless devices, such sources can include an IC, memory, and/or contactless interface of the device. Additionally or alternatively, contactless devices and other forms of fare media 250 can include a magnetic stripe, a bar code, and/or data imprinted and/or embossed on the device, which can serve as additional sources of information. Contactless and other sources of information can serve as repositories of account information related to, for example, a financial or user account associated with the fare media 250 (which may not be associated with the transit system 100).

TVMs 212 may interact directly with a fare media 250 through, for example, a contactless connection 232. Although communication of the contactless connection 232 may be two way, fare media 250 may simply communicate an identification code to TVM 212. This can be done, for example, to authenticate a contactless device for use as fare media 250 in the transit system 100. A contactless device does not have to be issued by a transit service provider in order to be authenticated and used as fare media 250 in the transit system, as long as the information communicated by the fare media 250 to the TVM 212 (and subsequently to access control points 208 for passage in the transit system 100) serves to uniquely identify the fare media 250. Such an authentication process is provided in greater detail below.

All or part of the information communicated by the fare media 250 can be used as an identification code to identify the transit fare media 250. This identification code can comprise one or more fields of data including or based on information such as a name, a birth date, an identification number (such as a PAN), a social security number, a drivers license number, a media access control (MAC) address, an electronic serial number (ESN), an international mobile equipment identifier (IMEI), and more. Because the identification code is unique, it can be associated with a transit user account, and utilized by a user at a TVM 212 to access and/or update information associated with the transit user account.

In some instances, an identification code may be assigned by a transit service provider and written to the fare media 250, such as an NFC-enabled mobile device 280. For example, a transit application running on an NFC-enabled phone can generate or otherwise provide an identification code to be transmitted from the phone at access control points 208 of the transit system 100. In other instances, if TVM 212 is utilized to enable a user to create a transit user account, the TVM 212 may also write an identification code to an unused portion of a memory of the fare media, such as integrated circuit chip file space on a smart card or an NFC component on the NFC-enabled mobile device 280.

Figure 3:
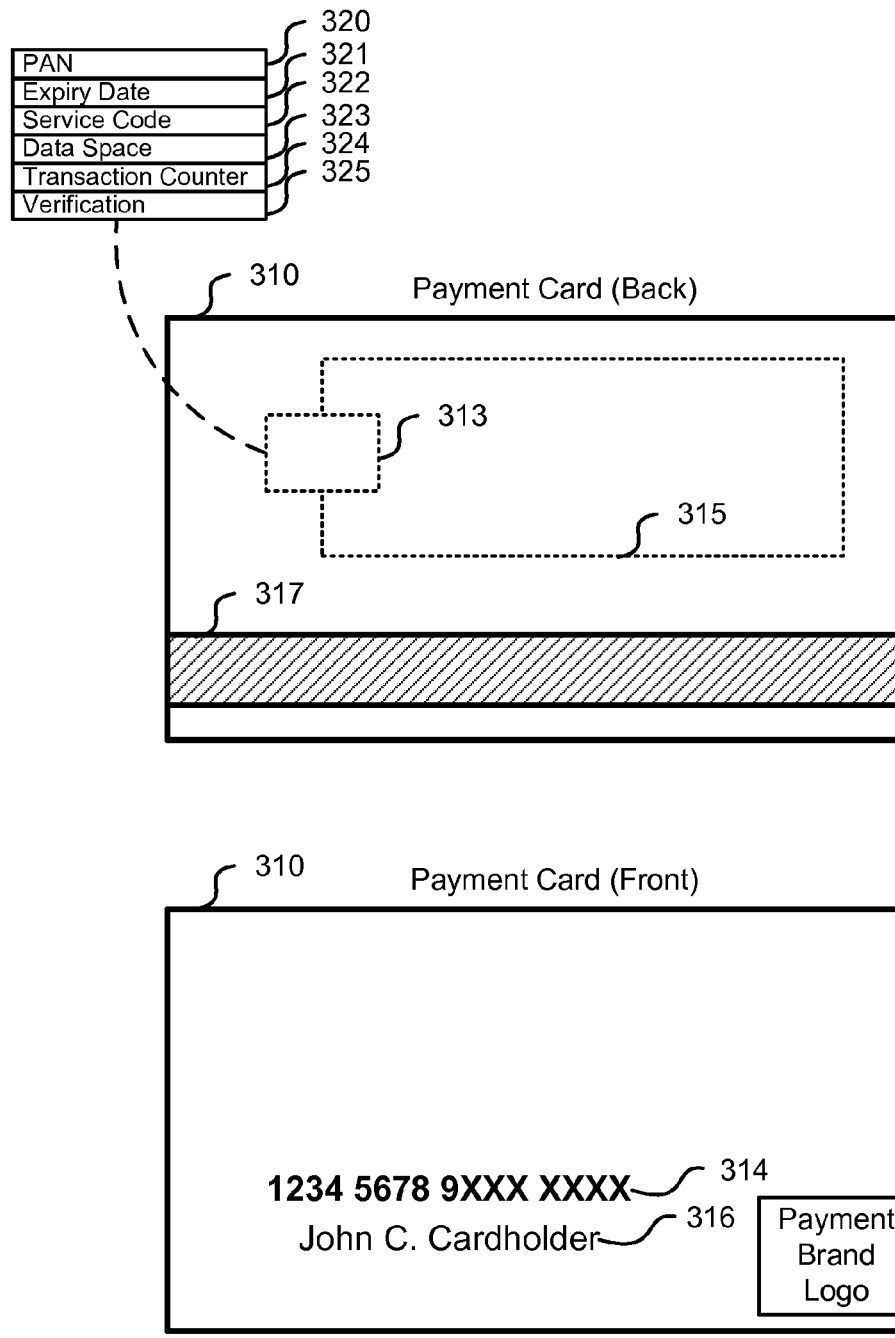
FIG. 3 is a simplified illustration of front and back views of a contactless payment card that can be enabled as fare media in a transit system, according to certain embodiments.

FIG. 3 illustrates front and back views of an embodiment of a contactless payment card 310 that can be enabled as fare media 250 in the transit system 100. Such contactless payment cards are widely available, can be issued by any of a wide variety of issuing banks, and can include a payment brand. The contactless payment card 310 can include an integrated circuit (IC) 313 configured to, among other things, store account information, such as a PAN, expiry date, name associated with an account, etc. The IC 313 can adhere to one or more relevant standards, such as the Europay, MasterCard, and VISA (EMV) standard, and can be coupled with an antenna 315 for communicating information wirelessly to a contactless card reader (not shown). Contactless payment cards 310 frequently adhere to standards set by the International Organization for Standardization and/or International Electrotechnical Commission (ISO/IEC), such as ISO/IEC 14443 or ISO/IEC 15693 standards for contactless smart card communications. The IC 313 and antenna 315 can be embedded in the payment card and are frequently not visible to a card user.

The contactless payment card 310 can include features and/or data common to other payment cards, as defined in other ISO/IEC standards, such as ISO/IEC 7810 and ISO/IEC 7813. This can include a magnetic stripe 317, a payment brand logo 318, an account number 314 (such as a PAN, which can be printed and/or embossed on the contactless payment card 310) and a cardholder name 316.

EMV is an emerging global standard for the inter-operation of IC-enabled payment cards. The EMV standards define the interaction at the physical, electrical, data and application levels between IC cards and IC card processing devices for financial transactions. There are standards based on ISO/IEC 7816 for contact cards, and standards based on ISO/IEC 14444 for contactless cards. The cards following the EMV standard have additional information stored on the card 310. This information includes the PAN 320, an expiry date 321, a service code 322, an issuer discretionary data space 323, a transaction counter 324, and a calculated verification value based on an algorithm that includes the transaction counter 324 as a dynamic value 325. EMV transactions may also include other parameters outside of the track data.

For each use of the contactless interface antenna 315 on an EMV-compliant contactless payment card 310, the card 310 increments the transaction counter 324 value by one. The counter is incremented by the IC 313 on the card 310. Therefore, the counter increments whether or not there is an associated retail transaction forwarded to an financial institution 160. Using the EMV card 310 as a contactless fare media would cause the transaction counter 324 to increment, even though financial institution that issued the card is not involved in the transaction.

Figure 4:
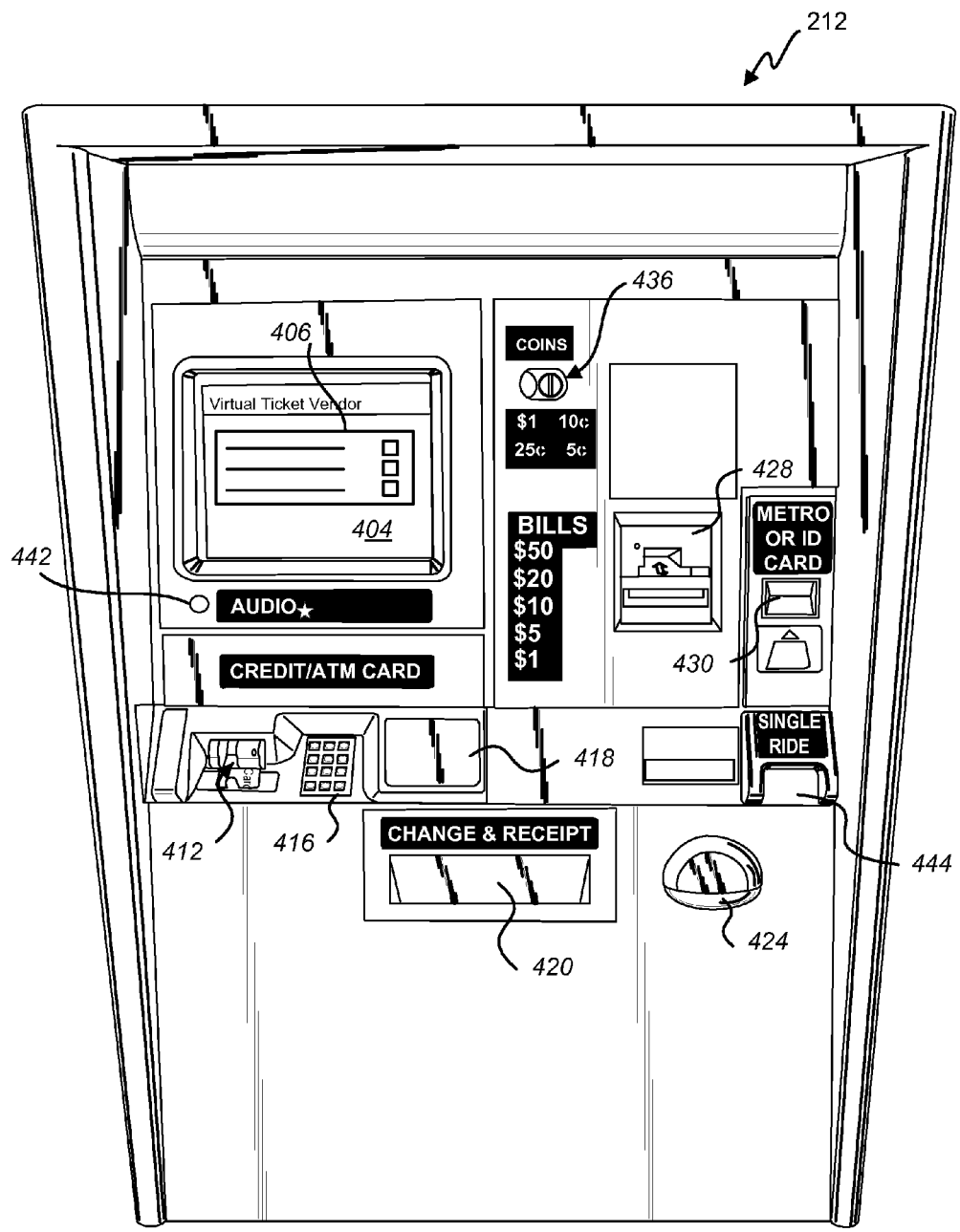
FIG. 4 is a perspective view of an embodiment of a transit vending machine that can be used to enable contactless devices, such as a contactless payment card, for use as fare media.
Figure 5:
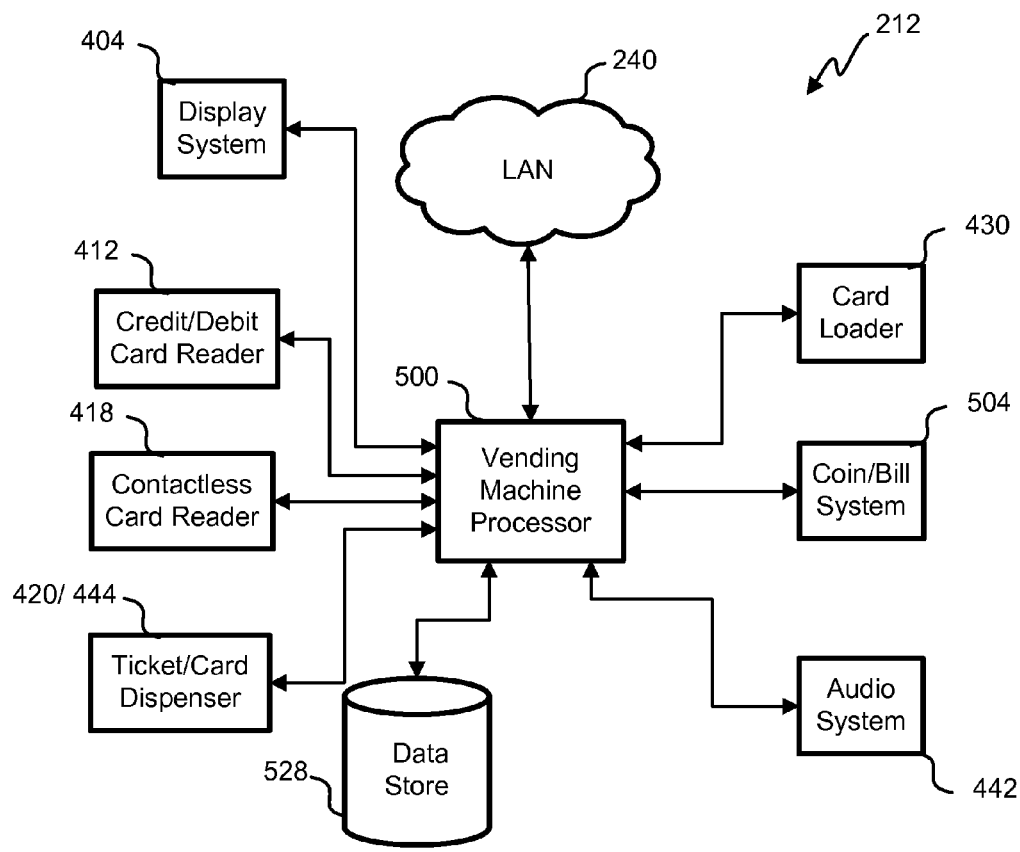
FIG. 5 is a block diagram of an embodiment of a transit vending machine that can be used to enable contactless devices, such as a contactless payment card, for use as fare media.

In FIGS. 4 and 5, a perspective view and block diagram of an embodiment of a TVM 212 are shown. A vending machine processor 500 is coupled to the other components of the TVM 212 and transmits and receives signals to and from the other subsystems to cause the other components to perform their intended functions. Fare cards can be purchased and/or reloaded with value at the TVM 212. A coin/bill system 504, magnetic stripe card reader 412, and contactless card reader 418 are used to make payments for transactions at the TVM 212. Additionally or alternatively, a contactless card reader 418 may be coupled with a magnetic stripe card reader 412 to enable simultaneous reading of contactless and magnetic stripe information. A keypad 416 is provided adjacent to the credit/debit card reader 412 to enter numerical information such as a PIN code for a debit card. A coin slot 436 and bill loader 428 are used to accept cash. Change is returned in a change/receipt slot 420 and coin return 424. Reloadable fare cards and receipts, including receipts having a activation code, are also provided in the change/receipt slot. TVM 212 may further dispense single-ride fare cards through card dispenser 444, which is coupled with a card storage unit (not shown) storing reloadable prepaid cards for distribution. Information regarding transactions may be communicated through a LAN 240 by the vending machine processor 500 using, for example, a network interface (not shown).

Information regarding transactions may be communicated to various entities. For example, a contactless PAN, a magnetic stripe PAN, and/or other information may be communicated to the central ticketing system 112 to create a transit user or temporary account. Additionally or alternatively, a PAN and other payment information may be transmitted to a card issuer or other financial institution 160 for payment of a transit product. The financial institution 160 can receive communication from TVM 51 via financial network 150, central ticketing system 42, and/or WAN 140. Moreover, a financial account associated with a contactless payment card 310 may comprise a funding source 165 maintained by a financial institution 160.

A display system 404 prompts the card holder through the refill/purchase process. For example, the screen prompts the purchaser to touch a start button/icon on a touch screen display of the display system 404 to begin the process. A textual display portion 406 can display textual instructions for the user after the process has begun. Additionally or alternatively, an audio system 442, including a speaker, can produce audio commands. The user can be given a menu of choices of how to proceed. For example, the menu may include choices to purchase or reload a reloadable fare card, purchase a single-ride fare card, purchase a product, setup a transit user account, and/or associate a contactless device, such as a contactless payment card, with a transit user account. It will be understood that, additionally or alternatively to a touch screen display, other input interfaces may be utilized to accept input from a user. This can include, but is not limited to a touchpad, keyboard, mouse, trackball, audio input interface, joystick, etc.

If the user chooses an option requiring payment, the user may be instructed, by menu prompts, pre-recorded video and/or audio, on how to proceed with the payment. The user can be given a choice to pay in cash or by a payment card. For cash purchases, the user is instructed to insert coins or bills into the coin slot 436 or the bill loader 428. For payment card purchases, the user is instructed to insert payment card into the magnetic stripe card reader 412, or touch a contactless payment card 310 to contactless card reader 418.

Different processes may be implemented if the user chooses to enable a contactless payment card 310 as fare media 250. For example, the user can be instructed to touch a contactless payment card 310 to contactless card reader 418. Additionally, the user would be instructed to insert the contactless payment card 310 into the magnetic stripe card reader 412 and/or input the imprinted and/or embossed PAN 314 by using the keypad 416, the display system 404 (if it includes touchscreen capabilities), or both. Alternatively, for TVMs 212 with a contactless card reader 418 coupled with a magnetic stripe card reader 412, a user can be instructed to insert the contactless payment card 310 into the magnetic stripe card reader 412, allowing the TVM 212 to read both the contactless and magnetic stripe information from the contactless payment card 310. The TVM 212 can be configured to provide additional functions such as allowing the user to purchase a product, activate the contactless payment card 310 as fare media 250, and/or create a transit user account, by, for example, accepting additional input through any one of the user interfaces described above. Additionally or alternatively, the TVM 212 can simply print out an activation code on a receipt and provide the receipt to the user from the change/receipt slot 420. The transit system 100 can associate the activation code with information collected from the contactless payment card 310, enabling the user to perform any of the additional functions listed above at a TVM 212, ticket booth, website and/or other system at a subsequent point in time.

It will be understood that any or all of the features and/or capabilities of the TVM 212 described above may be included in other locations and/or devices of the transit system 100. A user may therefore register a contactless device, such as a contactless payment card 310, as fare media at other locations of the transit system 100. For example ticket booth computers 220 can be coupled with contactless card readers and/or magnetic stripe card readers, allowing a user to perform any or all of the functions described above by providing a contactless payment card 310 to a transit worker at a ticket booth. Additionally or alternatively, other devices may be configured to read contactless and magnetic stripe information from a contactless payment card 310 and transmit the information to a central ticketing system 112 of the transit system 100, without having the additional functionality of a TVM 212. Such devices further can be configured to print a receipt with an activation code, enabling a user to complete, at a later point in time, the process of activating a contactless payment card 310 for use as fare media 250. Moreover, these procedures may be carried out at a sales office, automated teller machine, and/or other manned or unmanned locations.

Figure 6A:
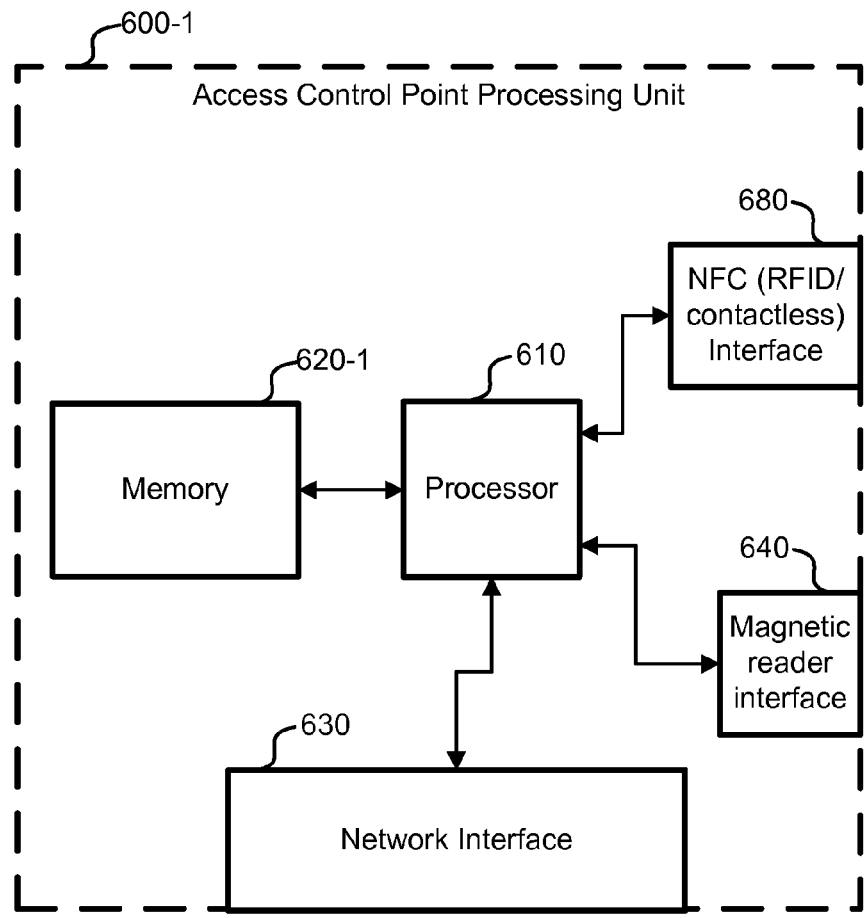
FIG. 6A is a simplified block diagram of an embodiment of an access control point processing unit of a transit system.

FIG. 6A is a simplified block diagram of an embodiment of an access control point processing unit 600-1, which can be coupled with and/or integrated into access control points 208 of a transit system 100 and can control certain physical properties of access control points 208 such as to allow or deny passage of a user. Among other things, the access control point processing unit 600-1 can be used to read an identification code, such as a contactless PAN and/or other contactless information, from fare media. The access control processing unit may also record transaction identifiers, such the time and location of the transaction. The access control point processing unit 600-1 also can determine whether to permit passage of a user at the access control point 208. Interfaces such as an NFC interface 680 (which can read RFID and contactless information), and/or magnetic reader interface 640, can be used to receive information from fare media 250, including an identification code. Alternative embodiments contemplate access control processing units 600 without a magnetic reader interface 640. Once the identification code is received, it can then be sent to processor 610.

In addition to performing any decryption and/or verifying any security features, the processor 610 can compare the identification code against lists stored in memory 620-1 and/or other data store to determine whether to allow passage of the user at the access control point 208. Lists can be generated and maintained from a central system, such as the central ticketing system 112. The central system can send updated list information to station server 224 via WAN 140 or directly with the central ticketing system 112 through WAN 140 (e.g., the Internet) or LAN 240. The station server 224 can store updated list at the station data store 216 and/or communicate the updated list information via LAN 240 to access control point processing unit 600-1, which receives the information at network interface 630. U.S. patent application Ser. No.

12/833,404, entitled "Reloadable Prepaid Card Distribution, Reload, And Registration In Transit," (hereafter, the "'404 Application") which is incorporated herein, details how the transit system 100 and access control point processing units 600 may use lists to determine whether to allow passage of the user at access control points 208. Once the determination is made, the processor 610 can cause the access control point processing unit 600-1 to physically allow or deny passage of a user at the access control point 208.

The access control point processing unit 600-1 can also log transaction information in memory 620-1 and/or communicate the transaction information to station server 224 with a network interface 630. The station server 224 can, in turn, send the transaction information to the central ticketing system 112, which can store the information in central data store 114. The transaction information can be used to update transit user accounts associated with the transactions and to settle with a funding source 165.

Figure 6B:
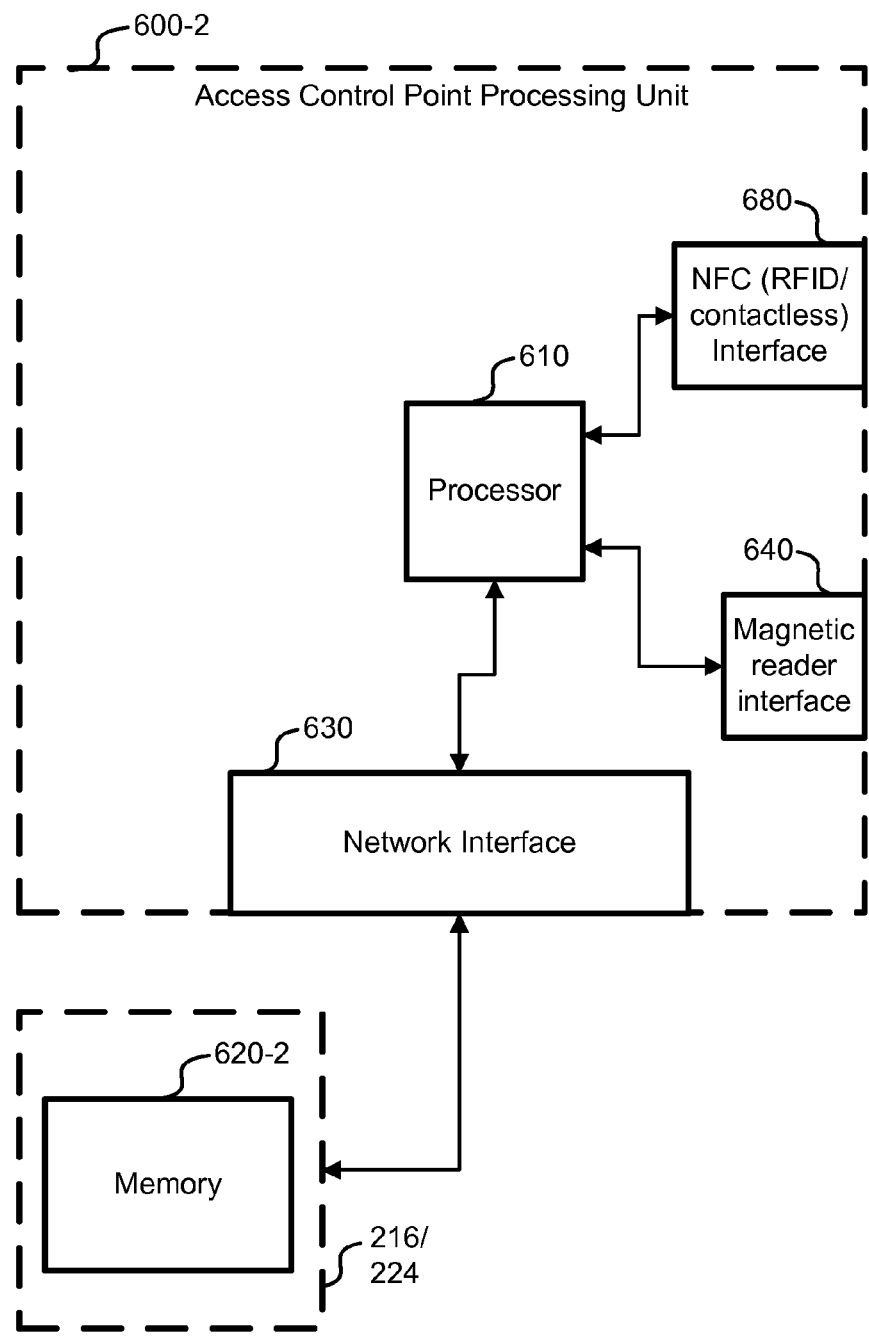
FIG. 6B is a simplified block diagram of an alternative embodiment of an access control point processing unit of a transit system.

FIG. 6B is a simplified block diagram of an alternative embodiment of an access control point processing unit 600-2. As illustrated, a memory 620-2 may be located at a source external to access control point processing unit 600-2. The external source can include, for example, station server 224 or station data store 216. In such an embodiment, the processor 610 may communicate with the external source in deciding whether to allow or deny passage of a user at an access control point 208, or the decision may be made by station server 224. In either case, it is desirable to make the decision quickly, often in 500 milliseconds or less. Thus, in this embodiment, it can be desirable that the connection between access control point processing unit 600-2 and the external source having memory 620-2 have sufficient speed and minimal latency to provide for a quick decision. Methods of allowing or denying access to a user at access control points 208, as well as methods of processing transactions received from access control points 208, are described in more detail in the '404 Application.

Figure 7A:
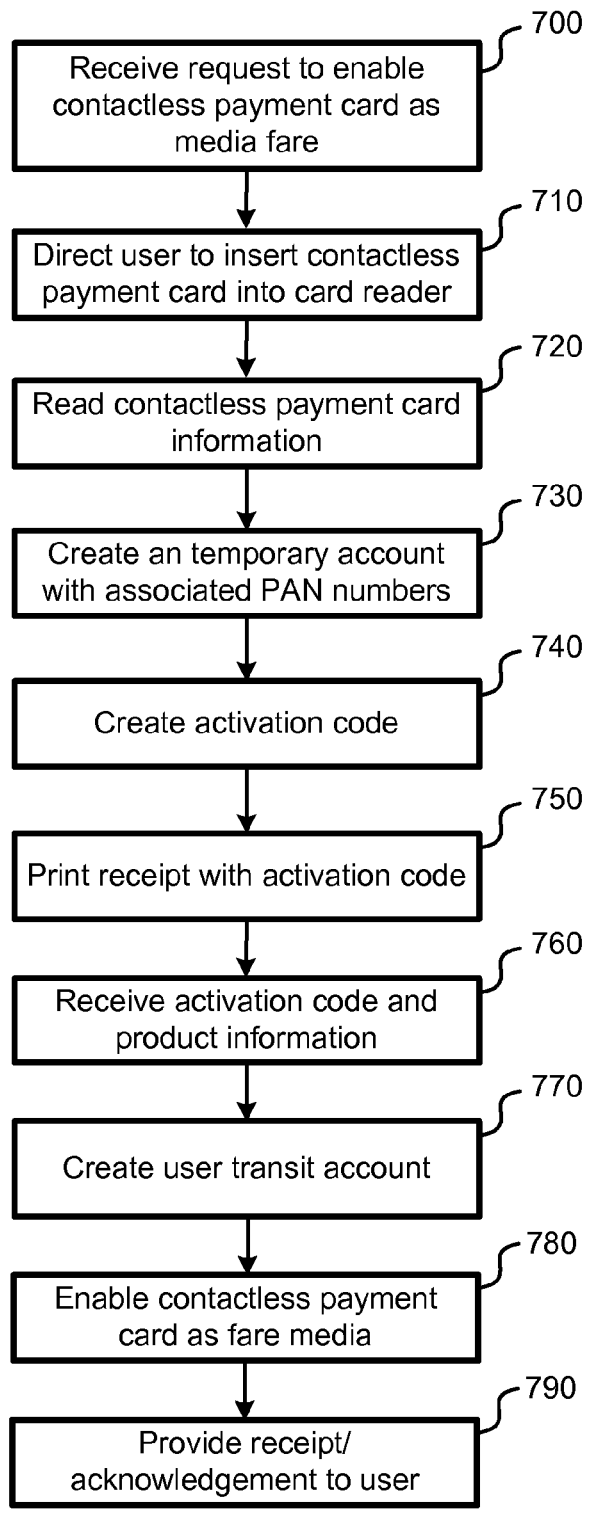
FIG. 7A is a diagram of a method for enabling a contactless payment card to be used as fare media in a transit system, according to some embodiments.

FIG. 7A is a diagram of an embodiment of a method for enabling a contactless payment card 310 to be used as fare media 250 in a transit system 100 providing account-based transactions. Beginning at block 700, a request is received to enable a contactless payment card 310 as fare media. For example, a user may select a menu option at a TVM 212 to make such a request. At block 710, a user is directed to insert a contactless payment card 310 into a card reader.

At block 720, card information is read. As described above, a device such as a TVM 212 may include a magnetic stripe card reader 412 integrated and/or coupled with a contactless card reader 418 such that the device can read the magnetic stripe and contactless information at the same time. Alternative embodiments contemplate variations on reading card information. For instance, where card readers are not integrated, the user may be directed to tap a contactless card reader 418 and insert the card into a magnetic stripe card reader 412 separately, in which case, the contactless and magnetic stripe information correspondingly is read in discrete steps.

In some instances, the contactless PAN may match the PAN of the magnetic stripe. However, to overcome the problems introduced by multiple cards with an identical PAN, a unique "fingerprint" of the contactless payment card 310 can be identified. To do so, additional track data components can be used to decipher one contactless PAN from another. For instance, track data includes name and expiry data. Additionally, some card issuers place a sequence code into the track data to make the contactless payment card 310 uniquely distinguishable. Thus, in addition to reading the contactless PAN and the PAN of the magnetic stripe, the device in which a user inserts and/or taps a contactless payment card 310 can be configured to read additional contactless track data, such as a sequence code, account holder name, and/or expiry date. Access control points 208 of the transit system 100 can be similarly configured to read the additional contactless track data to be able to access the uniquely distinguishable information.

Because the PAN of the magnetic stripe is typically identical to the imprinted and/or embossed PAN 314, a device may be configured to receive the imprinted and/or embossed PAN 314 rather than the PAN of the magnetic stripe. For instance, a TVM 212 can be configured to allow a user to manually enter the imprinted and/or embossed PAN 314 using a keypad 416 or touchscreen. Moreover, a device may have visual scanning capabilities to read the imprinted and/or embossed PAN 314 directly. It will be understood that other information such as an expiry date or account holder name, can be read from the magnetic stripe and/or otherwise received by the transit system.

At block 730, a temporary account with associated PAN numbers, and any additional contactless track data, is created. The account simply can comprise an association of the contactless data with the other provided information. At block 740, an activation code is created, and at block 750, a receipt with the activation code is provided to the user.

At block 760, the activation code is provided, along with product information. The activation code and product information is associated with the information received earlier, and, at block 770, a user transit account is created. The transit user account can comprise the information of the temporary account in addition to the product information provided at block 760. It may also include additional information provided by a user, as well as the activation code. For example, after receiving a receipt with the activation code, a user can provide the activation code at a website and purchase a product, such as a monthly pass.

A user may provide additional information to personalize the transit user account. For example, a user may provide a name, phone number, address, email address, social security number (SSN) or other government-issued identifier, a drivers license number, a username, a passcode (such as a personal identification number (PIN) or a password), other identification verification information, and/or funding information. Depending on the desired functionality of the transit system, a user also may input information regarding opt-in or opt-out selections for additional services, user preferences, and/or additional product(s) for purchase to be associated with a transit user account. The account further may include other data generated by the transit service provider.

At block 780, the contactless payment card 310 is enabled as fare media, and a receipt and/or acknowledgement is provided to the user at block 790. Enabling the contactless payment card 310 for use as fare media within the transit system 100 can comprise sending the contactless information (e.g. uniquely-identifying information) of the contactless payment card 310 to a central database, such as the central data store 114 and/or multiple remote databases, such as the station data store 216, with which access control points 208 can communicate. Additionally or alternatively, the contactless information may be propagated to the access control points 208 themselves. Thus, in subsequent transactions where the contactless information is read from the contactless payment card 310 at an access control point 208, the access control point 208 can recognize the information as being related to a valid transit user account and allow a transit user access accordingly.

It will be understood that embodiments contemplate numerous variations to the method shown in FIG. 7A. For example, although providing a receipt with a activation code is desirable, it is not required. Rather than provide an activation code, a method include simply receiving the imprinted and/or embossed PAN, which a user can provide a subsequent registration over the Internet, at a ticket booth, or at another location of the transit system 100. Additionally or alternatively, embodiments contemplate allowing a user to link information received from the contactless payment card 310 to an existing user account. For instance, a user can provide user information contained in the transit user account, such as a username and/or passcode, at any time before or after information is read from the contactless payment card 310, allowing a the contactless and other information to be associated with the user account.

Figure 7B:
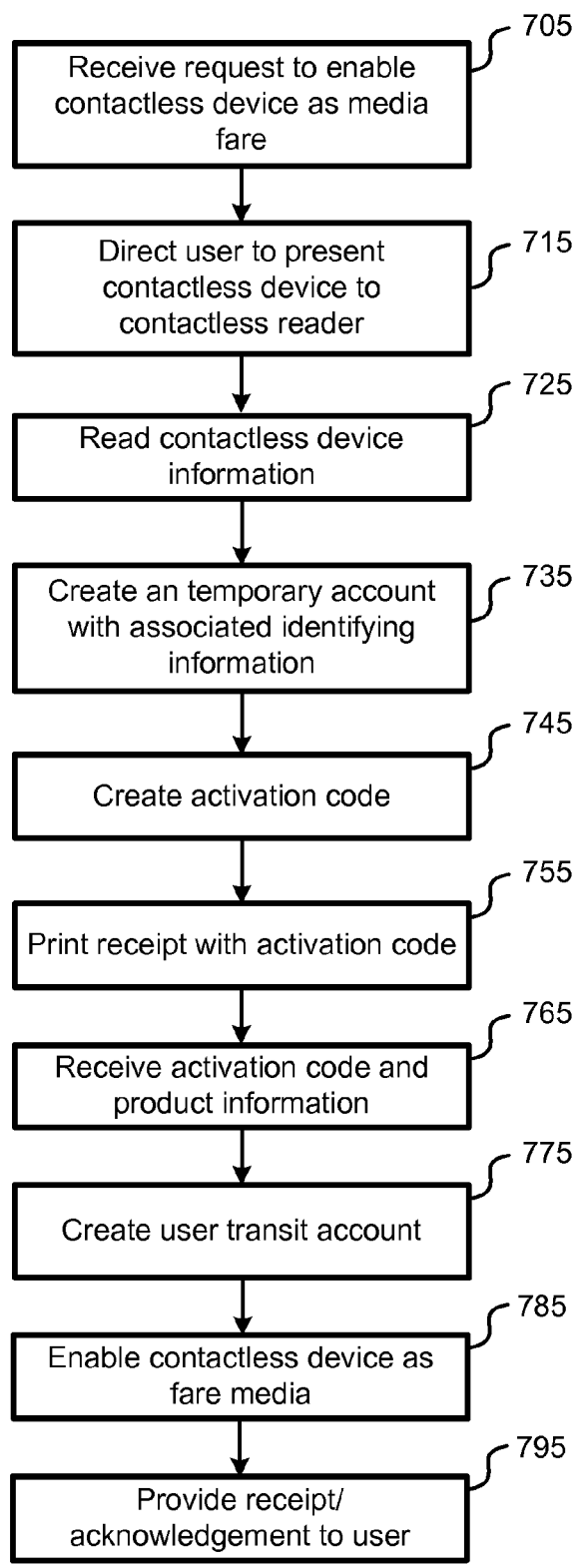
FIG. 7B is a diagram of an alternative method for enabling a contactless payment card to be used as fare media in a transit system, according to some embodiments.

FIG. 7B illustrates how a method similar to that shown in FIG. 7A can be extended to apply more broadly to contactless devices. Access control points 208 can be configured to read wireless information from contactless devices other than contactless payment cards 310, such as NFC-enabled mobile devices, RFID tags/stickers, contactless identification cards, etc. These devices may have contactless information uniquely identifying the device that may differ from information from another source of the device. Accordingly, a transit, transportation, or similar system can be configured to enable such contactless devices for use within the system in a manner similar to that of contactless payment cards 310.

Figure 8A:
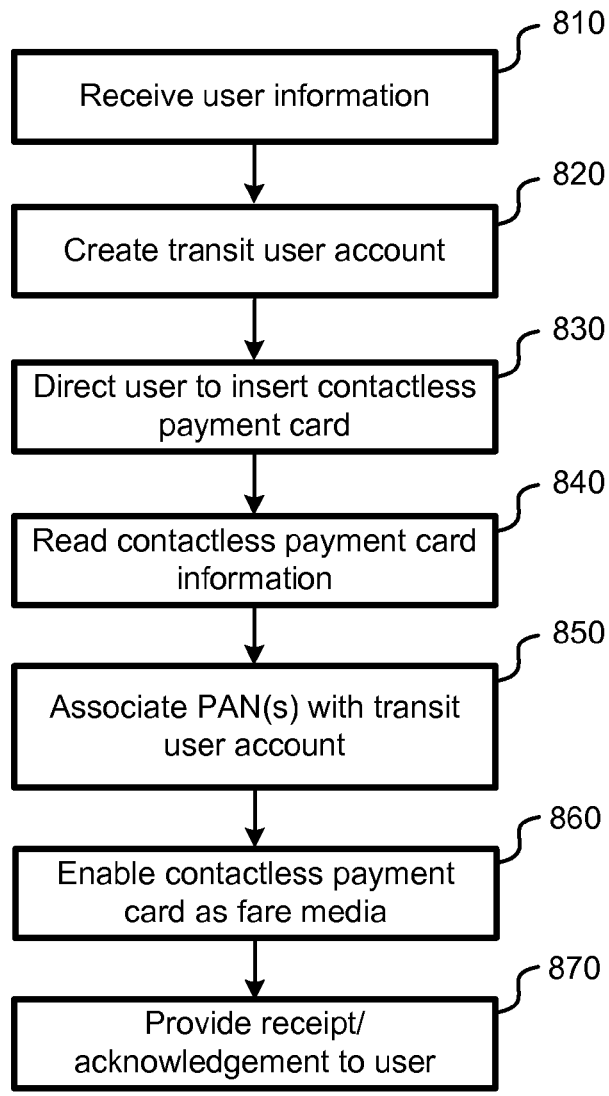
FIG. 8A is a block diagram of yet another method for enabling a contactless payment card for use as fare media in a transit system, according to some embodiments.

FIG. 8A is a block diagram of an embodiment of another method for enabling a contactless payment card 310 for use as fare media 250 in transit system 100. FIG. 8A illustrates how a user account may be created before information is read from the contactless payment card 310. FIG. 8A also demonstrates how the creation of the transit user account and the enablement of the contactless payment card 310 as fare media 250 can be done in a single session, without requiring additional steps at a later point in time.

At block 810, user information is received, and at block 820, a transit user account is created. Similar to the user information described above, the user information can comprise any of a variety of information, including product and payment information, among other things. At block 830, a user is directed to insert a contactless payment card 310. And at block 840, information is read from the contactless payment card, including contactless information. The information may also include information from a magnetic stripe, bar code, imprinted and/or embossed characters, and/or other sources of information.

At block 850, the contactless information, including a PAN, is associated with the transit user account. A PAN provided by another data source of the contactless payment card can also be associated with the transit user account. After which, at block 860, the contactless payment card 310 is enabled as fare media. And at block 870, a receipt and/or other acknowledgement is provided to the user. It will be understood that certain blocks, such as blocks 840-870, can be repeated at any time to allow a user with an existing transit user account to enable a handheld media, such as a contactless payment card or other NFC-enabled device, to be used as fare media. Such occasions can arise, for example, when a card issuer provides a user with a new contactless payment card before the expiry of an existing payment card.

Figure 8B:
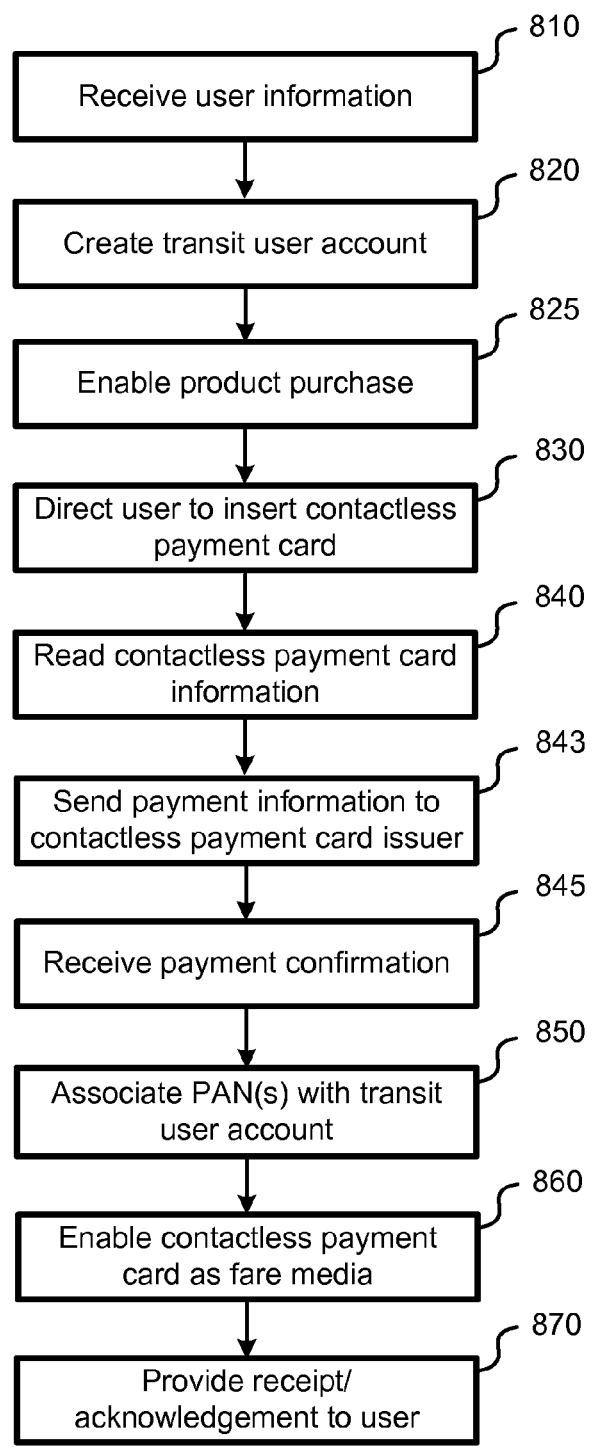
FIG. 8B is an embodiment of a method that incorporates the enablement of a contactless payment card for use as fare media with the payment of a transit and/or transportation product using the contactless payment card.

FIG. 8B is an embodiment of a method that incorporates the enablement of a contactless payment card 310 for use as fare media 250 with the payment of a transit and/or transportation product using the contactless payment card 310. In addition to the steps shown in FIG. 8A, the embodiment of FIG. 8B includes block 825, enabling product purchase. This can include, for example, allowing a user to select a transit and/or transpiration product from a menu. Additionally, block 843, payment information, such as the PAN, expiry date, and other information is sent to a card issue for verification. At block 845, payment confirmation is received. As with all methods described herein, numerous variations may be made. For example, at any of a variety of points during the process, a user may be allowed to select whether or not to enable the contactless payment card 310 for use as fare media 250. It will be understood further that other embodiments described herein can incorporate payment of a product with the contactless payment card 310 similarly.

Figure 9:
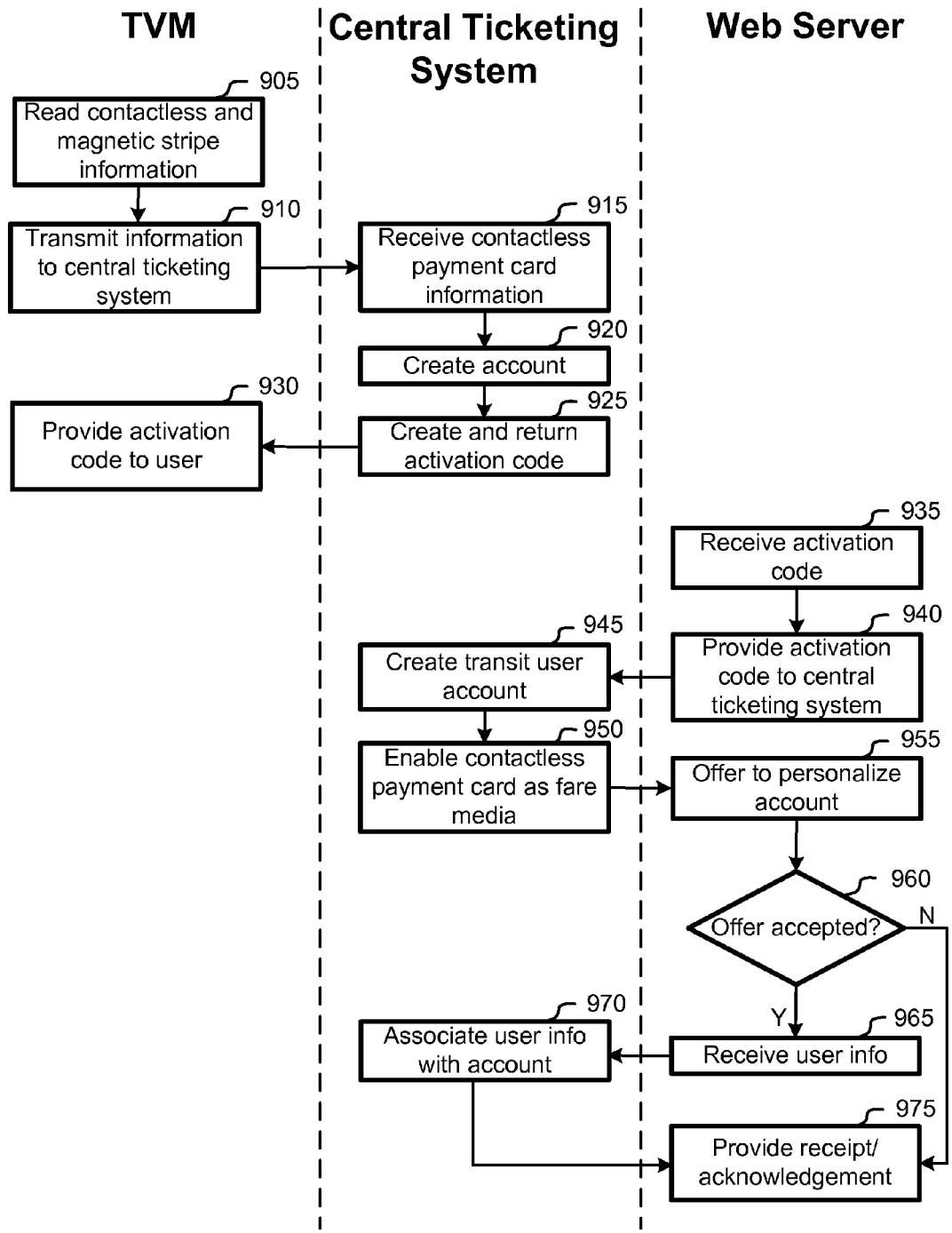
FIG. 9 is a swim-lane diagram of yet another embodiment of a method for enabling a contactless payment card for use as fare media.

FIG. 9 is a swim-lane diagram of yet another embodiment of a method for enabling a contactless payment card 310 for use as fare media 250. FIG. 9 illustrates how the method may be performed by a TVM 212, a central ticketing system 112, and a web server. The web server can host a web site for receiving input from a user. Such a web server can be maintained or otherwise communicatively connected with the central ticketing system 112. Moreover, the web server comprise part of the central control system 110 of a transit system 100.

At block 905 the TVM 212 reads the contactless and magnetic stripe information from a contactless payment card 310. At block 910 all, or at least a part, of the information is communicated to the central ticketing system 112. At block 915, the central ticketing system 112 receives the information, and at block 920, creates the account. At block 925, the central ticketing system 112 can then create and return an activation code. At block 930, the TVM 212 provides the activation code to the user.

With the activation code, the user can then access a website hosted by the web server to complete the enablement process. At block 935, the web server receives the activation code. This can be done, for example, simply by providing a website with a small form to fill out and submit, including a text box for the activation code. Product and payment information may also be received by the web server. At block 940, the web server provides the activation code to the central ticketing system 112.

At block 945, the central ticketing system 112 creates a transit user account with, among other things, information received at block 935. At block 950, the central ticketing system 112 enables the contactless payment card 310 as fare media in the transit system 100. The central ticketing system 112 can notify the web server that the contactless payment card 310 has been enabled.

At block 955, or alternatively at an earlier point in the process, the web server can further offer to personalize the transit user account. At block 960, if the offer is rejected, the web site can, at block 975, simply relay receipt and/or acknowledgement information to the user. Otherwise, at block 965, the web server can receive additional information from the user by, for example, providing an additional online form, which is submitted by the user. The information is relayed to the central ticketing system 112, and at block 965, associated with the transit user account. At block 970, the web server provides receipt and/or acknowledgement information to the user.

Processing of contactless payment cards in the transit system can be based on the PAN as a unique identification code. The PAN is available to an access control point 208 configured to read contactless track data from the contactless payment card 310. The PAN can be extracted from the track data and used to identify the card for account-based processing. Under most circumstances, the PAN imprinted and/or embossed on the front of the card is the same as the PAN found in the track data and stored on in the card's 310 integrated circuit 313.

If the contactless PAN stored in memory of the IC 313 of a contactless payment card 310 is different than the PAN imprinted and/or embossed 314 on the front of the card, additional difficulties arise. For example, it would be particularly difficult to allow a transit user to use the Internet to register the contactless payment card 310 for use as a fare media 250. Because access control points 208 are configured to read the contactless PAN from the contactless payment card 310, it would not avail the transit user to enter the imprinted and/or embossed PAN 314.

One way to solve this and other problems may be solved by providing the imprinted and/or embossed PAN 314 and the contactless pan beforehand. For example, a transit user can swiping and/or dipping the contactless payment card 310 at a TVM 212 or other device of the transit system 100 configured to read information the magnetic stripe 317, which frequently includes a PAN that including a PAN that matches the imprinted and/or embossed PAN 314. The device can also read the contactless PAN from the IC 313. The transit system can then associate the contactless PAN with the imprinted and/or embossed PAN 314, enabling a user to access the Internet subsequently and enter the imprinted and/or embossed PAN 314. The transit system 100 can then associate any additional user and/or product information with the contactless PAN, and enable the contactless payment card 310 for use as fare media in the transit system 100. More details describing this process are provided below.

Usually, the PAN 314 on one contactless card 310 will be different and distinct from the PANs on other payment cards, thus enabling the transit system to treat each PAN 314 as a unique identifier associated with each user account. However, there will be variations that the transit system 100 may need to contemplate. Bank card issuers have their own issuing rules and procedures, which may result in multiple cards 310 with the same PAN 314. Also, fraud and theft may result in illegitimate handheld media encoded with a stolen PAN 314 that could be used as a fare media 250. When different cards/devices have the same PAN there is a problem correctly associating the registered card with the purchased fare products. Accordingly, some embodiments disclosed herein include methods allowing for such determination and providing ways to combat a possible scam or fraud.

Contactless bank cards can be used in account-based transit fare collection in two modes: (1) pay as you go; and (2) where the card is registered and fare products are purchased and associated with that bank card account number. In the second case, when the bank card account number is read, for example at a contactless interface 680, and processed in the transit system 100 as a fare media 250, it is associated with the account-based fare product. This association can be made by the transit system 100 using hardware, software, or a combination of the two.

A problem arises when contactless account number (PAN) are not be unique amongst cardholders. Fraud may be prevented by not allowing random bank cards/devices to be registered against account-based products and/or requiring that cards used for passes and discounted fare products must be of agency issued media. But this would be limiting and not be convenient for the patron. Alternatively, a fare collection system could demand that card issuers do not issue single PANs 314 on multiple cards/devices. But this may not be practical. Many card issuers exist, each with their own process for card numbering, and they are unlikely to conform to the needs of a transit agency.

One variation of this problem can include multiple parties linked to one financial account, such as a husband and wife, a parent and child, or multiple business partners, each having access to the joint account. Each joint-account holder could be issued a payment card 310 associated with the joint account, and each card 310 could have the same PAN 314 embossed on the card and/or stored in the track data (e.g., magnetic stripe 317) and/or IC 313. To further illustrate, if a transit user with a transit user account purchases a single, flat-fare monthly pass and associates the PAN 314 of a contactless payment card 310 with his/her transit user account, each additional contactless payment card having the same PAN 314 could also be used as fare media 250 for the monthly pass. Thus, if the multiple contactless payment cards 310 are distributed among several people, each person essentially would receive a monthly pass when only one monthly pass was purchased. In another variation, a single account holder may be issued multiple devices which provide access to one or more accounts. For example, a user may be issued multiple payment cards 310 and/or companion devices, such as another style of contactless payment card, an RFID-enabled sticker, a key chain tag, a FOB, etc. In another variation, an account holder may receive a replacement card prior to the time that an enrolled payment card 310 expires. This could result in a period of time between the time when the replacement card is activated and when the original card 310 expires when both cards could be validly read as a fare media 250 at a access control point 208.

Another problem may involve only a single card 310 that is used by multiple people as a fare media 250. In one variation, a user account may contain a type of transit product that allows for unlimited access to the transit system during a limited time, such as a monthly or weekly pass. In this case, a single payment card 310 may be used as a fare media by multiple users at one or more access control points. For example, the card owner could use the card 310 in conjunction with the NFC interface 680 of a single access control point 208 to allow additional transit users to enter an access control point 208 either before or after the card owner. In another variation, the card owner could use the payment card 301 himself/herself, and then pass the card 310 back to other transit patrons on the other side of the access control point 208 for reuse. In yet another variation, the transit product associated with the user account could be non-transferable. In this case, a payment card 310 could be cancelled by the issuing bank at the request of the owner, then sold for use solely as a fare media 250 to another user until expiration of the transit product.

In addition to misuse by legitimate holders of the payment card 310, fraud and theft can also lead to multiple handheld media devices that are associated with the same PAN 314. In one variation, a payment card 310 could be stolen from a user, and a replacement card could be mailed from the issuing bank. If the replacement card had the same PAN 314, then both the stolen card 310 and the replacement card could be used as a fare media 250. In another variation, the payment card 310 itself may not be stolen; however, the stored data including the PAN 314 could be stolen from the card 310, associated with another handheld media, and used as a fare media 250 without the knowledge of the card owner. This situation could be particularly worrisome to the transit system 100 if the thief were to only use the card 310 as a fare media 250. Unless the thief were to also use the PAN 314 in retail transactions, the issuing bank and the card owner would have no means of knowing that the payment card data had been stolen. Without being able to benefit from the issuing bank's existing fraud-detection schemes, the transit agency 100 would need its own method of detecting when a handheld media with a PAN 314 associated with a user account is being potentially misused.

In the above circumstances, the contactless payment card issuer knows how to associate each card variation and can charge the single bank account as appropriate. The transit system 100, however, will not be able to automatically decipher most of these circumstances. Because the transit system 100 allows for account-based transactions, the inability to take into account the above circumstances can be problematic in many ways. Ideally, the issuer would have to communicate to the transit agency regarding multiple card scenarios and fraud detection. This is not a practical solution due to the tremendous number of transit systems around the world and the number of payment cards in circulation. Regardless, the transit agency may be interested in determining whether more than one person is using a handheld media associated with a PAN 314 authorized as a fare media 250. As illustrated by the situations above, using the PAN 314 alone may not be sufficient to detect potential misuse. Additional data from the transaction may be necessary for the transit system 100 to perform this type of operation without assistance from the issuing bank.

According to certain embodiments of the present invention, this problem may be solved by using invented procedures and processes of automation to detect and stop multiple cards 310 and/or devices from using the same stored account-based fare product. This can include fraud detection mechanisms looking for exceptions and odd travel patterns on a single PAN 314 by analyzing additional transaction identifying data.

Figure 10A:
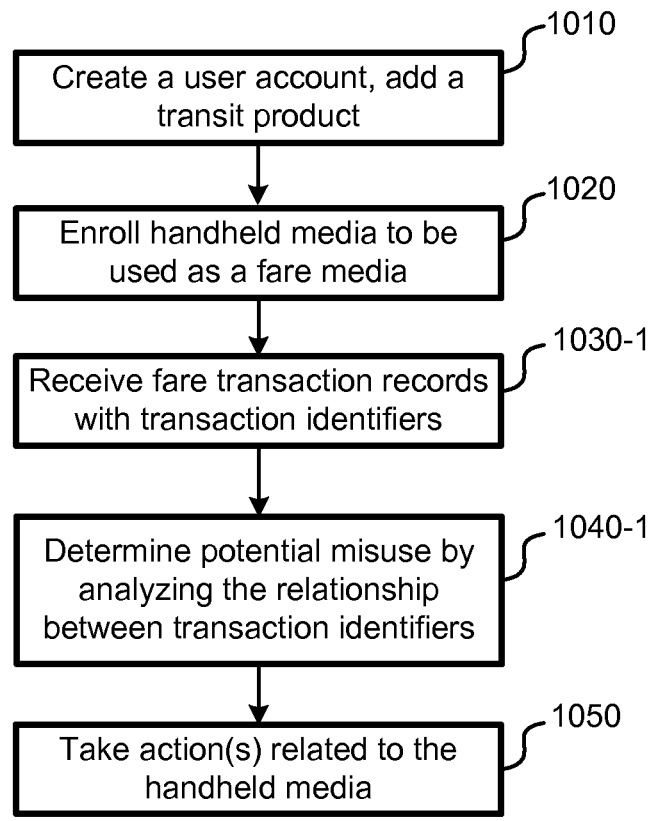
FIG. 10A is a block diagram of an embodiment for detecting potential misuse of a fare media using transaction identifiers.

FIG. 10A illustrates one embodiment of a method wherein the transit system 100 may collect additional information that is characteristic of each individual fare transaction. This additional information may be referred to as a transaction identifier, and it can be used to detect potential misuse of a payment card as a transit fare. In this method, a user account is created for managing transactional information wherein at least one transit product is purchased and/or designated for use at block 1010. At block 1020, a handheld media is enrolled for use as a fare media 250 for the transit product according to the various methods described above. The handheld media could be a payment card 310, a smart phone, a portable media player, a FOB, and/or the like. The handheld media may use contact with the access control point when used as a fare media, for instance with a magnetic stripe or a electrical contact. Alternatively, the handheld media may use a contactless connection with the access control point 208, such as with NFC-enabled devices, Bluetooth, RF, IR, or barcode devices. In one embodiment, the fare media is contactless payment card 310 using the EMV data standard.

The handheld media can be associated with all of the transit products associated with the user account, or the handheld media can be associated with one or more single transit products. In one embodiment, the transit product is an unlimited ride pass that is valid for a finite period of time, such as a monthly, weekly, or yearly pass. Alternatively, the transit product could include a limited-ride pass such as ten-ride pass. In this case, it would still be desirable for the transit system to detect potential misuse of a PAN 314 in order to protect its customers, to inspire customer loyalty, and/or to prevent the transfer of transit products between different users.

Next, at block 1030-1, the transit system 100 may receive a listing of transaction identifiers from one or more of the access control points 208. Each transaction identifier may be associated with a single use of a handheld media as a fare media 250. One or more transaction identifiers may be received and stored for each fare transaction involving a fare media 250, resulting in a plurality of transaction identifiers associated with a single PAN 314 over time. A transaction identifier may be a single piece of data, such as the time of the transaction. Alternatively, a transaction identifier may be comprised of more than one characteristic of the transaction. For example, a transaction identifier may include the time or location of the transaction, a user code, a one-time-use password, biometric data from the user, and/or track data from the card other than the PAN 314. In some embodiments, the misuse detection algorithms may also use other inputs in addition to the transaction identifiers, such as user inputs from the transit system 100, an authorized user, or law enforcement. These algorithms could incorporate other data, such as surveillance data or information from a financial institution. It will be understood that combinations of each of these data sources could also be incorporated to detect potential misuse.

The list of transaction identifiers may be stored and/or analyzed locally at the station server 224, or the list of transaction identifiers may be stored and/or analyzed remotely at the central ticketing system 112. If the transaction identifiers are analyzed remotely at the central ticketing system 112, they may be transmitted from the station systems 130 individually as they are collected from the access control points 208. Or, in another embodiment, the transaction identifiers may be stored locally at the access control points 208 or at the station server 224 or at a comparable local system. In this case, a list of transaction identifiers associated with a PAN 314 could then be transmitted to the central ticketing system 112 periodically in batches during off-peak travel times to reduce network traffic. These batches could be sent periodically, such as every 15 minutes, or they could be sent when a predetermined number of fare transactions have taken place. The transaction identifiers could be stored and/or transmitted in a dedicated list, or they could each be packaged in with other data. For example, if the transaction counters 324 in the EMV data are used as transaction identifiers, then they could be stored in the EMV data format in a cryptogram that is received from the payment card 310. The encrypted packets could be decrypted locally at the station systems 130, and the transaction counters 324 could be analyzed or transmitted to the central ticketing system 112. Alternatively, the encrypted data packets themselves could be transmitted to the central ticketing system 112 for decryption and analysis. It will be understood that a fare transaction record analyzed for potential misuse may include any arrangement of the data described above.

At block 1040-1, after a number of fare transactions have been recorded for a given PAN 314, the transaction identifier list can be analyzed to determine if there is potential misuse involving the PAN 314. To detect potential misuse, the transit system 100 could examine the relationship between at least a subset of the recorded transaction identifiers to identify patterns that are associated with misuse. In one embodiment, the transaction identifiers could be compared to an expected pattern for a typical transit system patron. In another embodiment, the transaction identifiers could be compared to an expected pattern of use for the user associated with the user account. Alternatively, the transaction identifiers could be analyzed to detect abnormalities in the use of the fare media associated with the PAN 314, such as transactions that would indicate that multiple cards are being used with a single PAN 314.

At block 1050 the transit system 100 may take an action related to using the handheld media as a fare media 250 in association with the transit product. Various actions can be taken, as described later in this disclosure.

Figure 10B:
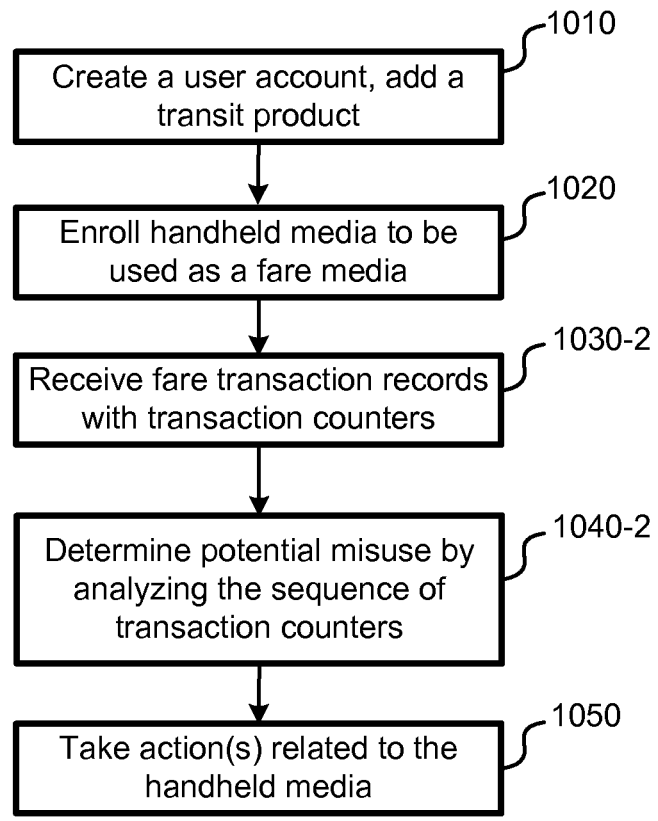
FIG. 10B is a block diagram of an embodiment for detecting potential misuse of a fare media using transaction counters as transaction identifiers.

FIG. 10B illustrates one embodiment similar to that of FIG. 10A, wherein the transaction identifier is comprised of the transaction counter 324 from an EMV data packet that is incremented during each contactless use as a fare media. At block 1030-2, the fare transaction records may include the transaction counter 324 as read from a payment card 310. The transaction counters 324 could be stored in the EMV data format in a cryptogram that is received from the payment card 310, and this entire cryptogram could be sent to the transit system 100 as a transaction fare record. Alternatively, the encrypted packets could be decrypted locally at the station systems 130, and the transaction counters 324 could be analyzed or transmitted to the central ticketing system 112.

At block 1040-2 potential misuse may be detected by analyzing the sequence of at least a subset of the transaction counters 324. Specifically, determining that potential misuse has occurred may be based on the relationship between the transaction counter 324 values. The detection algorithm may look for sequences of transaction counter values that appear to deviate from the expected pattern of values that would occur during normal use of a payment card 310. Normal use could include use as a fare media 250, use as in retail transactions, or a combination of the two. In most situations where the payment card 310 is also used for retail transactions, the algorithm may need to account for gaps in the transaction counter sequence depending on the time between uses as a fare media 250. The algorithm may also need to account for situations where the card 310 is reissued and used the transaction counter 324 is reset. Other variations in the transaction counter 324 sequence due to normal card use are contemplated by this invention.

In one embodiment, potential misuse may discovered by detecting large gaps in the transaction counter sequence that are not proportional to the time between uses as a fare media 250. In most cases, the transaction counter sequence should steadily increase, and the increments should go up in small numbers when the card 310 is used regularly as a fare media 250. For example, a set of transaction counters 324 sequentially recorded by a transit system that might not indicate potential misuse could be "5, 6, 8, 10, 13." Another example might be "125, 127, 128, 132." The small gaps in these sequences may indicate normal retail use between uses as a fare media 250. If the sequence reveals large gaps in the transaction counters 324, this may indicate that two cards 310 associated with the same PAN 314 are being used as a fare media 250 for the same transit product. For example, the sequence could be "12, 14, 15, 52, 53, 55." In this case, the gap between 15 and 52 could be used to determine that two different cards 310 with the same PAN 314 are being used. On the other hand, if there is a large amount of time between transaction number 15 and transaction number 52, then the gap may be attributed to normal retail use of the payment card 310 and not indicative of potential misuse. Therefore, some embodiments may determine whether the gap in the transaction counter sequence is proportional to the amount of time between fare transactions involving the card 310. For example, the determination could take into account the average gap size in the transaction counter sequence to gauge when a gap is large enough to indicate potential misuse. Thus, a sequence of "5, 16, 30, 44, 45, 60" may not indicate potential misuse even though the gaps are large between each transaction. This situation may instead indicate that the user is involved in a large number of retail transactions on a regular basis between fare transactions, even if the fare transactions are not relatively far apart in time.

Alternatively or additionally, the determination of potential misuse may also be made by detecting patterns of transaction counters 324 that do not continually increase. Even if a payment card 310 is involved in retail transactions in addition to being used as a fare media 250, the transaction counter 324 would typically increase, even with gaps in the sequence. For example, a sequence of transaction counters 324 such as "5, 6, 189, 9, 191, 192, 12" could indicate that more than card 310 with the same PAN 314 is being used, one with a transaction count near "5", and one with a transaction count near "191". The detection may also anticipate situations where the large gaps occur, or where a sequence jumps from high numbers to low numbers as a result of legitimate single-card use. An example sequence could be "250, 253, 255, 1, 4." Such situations may arise when a card is reissued by the financial institution or when the transaction counter 324 rolls over. In these cases, the detection algorithm may consider other inputs, such as the card expiry date 321, a known transaction counter limit, a notification from the user, and/or the like.

More sophisticated misuse of a payment card 310 might be more difficult to detect. For example, two users could be using cards 310 with the same PAN 314 and could coordinate the cards' use to prevent glaring out-of-sequence transaction counters 324. This could result in a transaction counter 324 sequence such as "80, 81, 83, 83, 84, 86, 87." In this case, the algorithm may need to look for more subtle errors in the sequence. Therefore, the determination of misuse may also look for duplicate numbers or sequences that do not show signs of normal retail transactions. In another embodiment, the determination of potential misuse could detect repeated patterns, such as "120, 122, 123, 120, 122, 123." Repeated patterns may indicate a careful collaboration between users of duplicate cards 310, or could indicate that a card 310 has been electronically pick-pocketed or skimmed, and a duplicate card 310 is being used without the card owner's knowledge. A determination that potential misuse does not necessarily implicate the card owner may be valuable in determining an appropriate action to take in response at block 1050 described later in this disclosure.

A determination of potential misuse involving the transaction counters 324 can also be made by developing use profiles of different transaction counter sequences, and then comparing the recorded sequences with the profiles. Recorded sequences that deviate sufficiently from an expected profile could indicate potential misuse. A profile may consist of certain transaction counter sequence patterns that are common. Alternatively, a profile may consist of descriptive information about expected profile patterns, such as average gap size, average transaction counter limit, and/or total number of retail transactions for each fare transaction. The profiles could be derived from multiple users and combined to create an average user profile. Alternatively, a profile could be derived from the usage statistics from users that are similar to the suspect user. In another embodiment, a profile may be based on the actual use of each individual user's transaction history. In this case, the determination algorithm may identify types a card use which deviate from the historical usage pattern of the particular user. Other methods of generating a comparison profile are contemplated by various embodiments, and may involve combinations of the various methods described above.

Figure 10C:
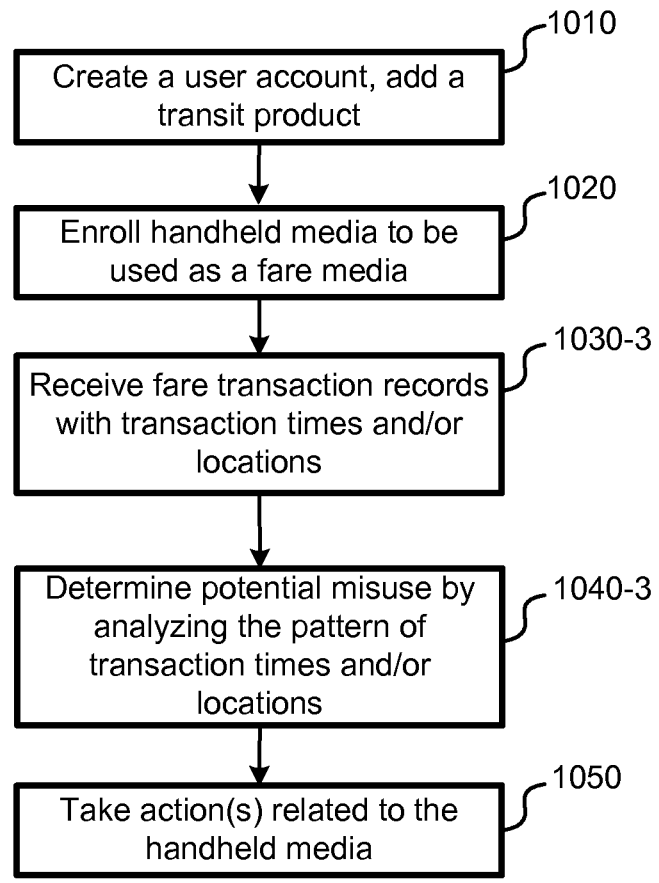
FIG. 10C is a block diagram of an embodiment for detecting potential misuse of a fare media using transaction times and/or locations as transaction identifiers.

Alternatively or additionally, other embodiments may use different data as a transaction identifier to detect potential misuse. FIG. 10C illustrates an embodiment wherein the time and/or location of a transaction is used as the transaction identifier. At block 1030-3, time and location data could be collected from the access control points 208 of the transit system 100 as a handheld media is used as a fare media 250. The data could be collected and packaged together in a data packet along with the data read from the handheld media. Alternatively, the time and location data could be stored and/or transmitted separately from the handheld media data. In another variation, the time and location data could be received from the handheld media itself, for example from a smart phone enabled with GPS location information. In any case, the transaction fare records made available to the transit system 100 may include transaction time and/or location data with an associated PAN 314.

At block 1040-3, potential misuse is determined, at least in part, by analyzing the pattern of transaction times and/or locations. The determination of potential misuse may identify travel patterns that are illogical, unlikely, out of character compared to a user profile, and/or physically impossible. In one embodiment, the determination may be made by detecting transaction times that are unlikely to occur. For example, multiple trips during the same day, although physically possible, may be unlikely. This situation may indicate that multiple users are handing off the same handheld media for use throughout the day. A large number of uses over a short period of time may indicate that a PAN 314 has been stolen and associated with a large number of handheld media. In another embodiment, the transaction time may be analyzed in conjunction with the transaction location. For example, fare transactions near the same time at distant locations may be indicative of two handheld media associated with the same PAN 314 being used by two different users for the same transit product. While some time and location combinations may be physically impossible, others may be possible but unlikely. In these cases, the potential for misuse may be determined to be proportional to the time and distance between locations. For example, uses at transit stations that are 30 miles apart may indicate potential misuse if the uses were 20 minutes apart. On the other hand, uses at two stations that are 30 miles apart may not indicate potential misuse if the uses occur more than 60 minutes apart.

In one embodiment, the time and/or location data may be compared to an expected user profile, and potential misuse may be determined by detecting deviations from the expected user profile. The profiles could be derived from multiple users and combined to create an average user profile. Alternatively, a profile could be derived from the usage statistics from users that are similar to the suspect user account. In another embodiment, the profile may be based on the actual use of each individual user's transaction history. In this case, the determination algorithm may identify types of card use which deviate from the historical usage pattern of the particular user. For example, if a particular user only travels between two transit stations on weekdays, then travel between different stations, or from a different starting station, may indicate potential misuse. Similarly, usage statistics from a single user account that do not establish any recognizable and/or predictable pattern may indicate that a card 310 is being exchanged by multiple users contrary to the rules of the transit product. Other methods of generating a comparison profile are contemplated by various embodiments, and may involve combinations of the various methods described above.

Using a transaction counter 324 or the transaction time and/or location as the transaction identifier in the determination of potential misuse, as described in embodiments hereinabove, are not meant to be limiting. Other embodiments may include other data that may be used as transaction identifiers. It may also be advantageous to combine data together as transaction identifiers to increase the effectiveness of the misuse detection. In one embodiment, the transaction identifier may include both a transaction counter 324 and the transaction time and/or location. For example, if the times and locations of a series of fare transactions indicate that the potential for misuse exists, the transaction counter 324 may be used to verify or dismiss the suspicious behavior. In another example, the transaction counter 324 might indicate potential misuse when the counter sequence contains a large gap or resets to a lower number. In this case, the times and locations of the transactions may be analyzed to either confirm the suspicious activity or to indicate that a valid user may instead be using a valid replacement card 310, that the user is making a large number of retail purchases, or that the card's transaction counter 324 has rolled over. It will be understood that further combinations of transaction data beyond those explicitly describe herein are also contemplated by these and other embodiments.

Block 1050 of FIGS. 10A-10C illustrates that in certain embodiments an action may be taken related to using a handheld media associated with the user account as a fare media 250. The type of action taken may be related to the type and/or severity of potential misuse. It may also depend on a customer preference or on the duration or extent of the potential misuse. For example, in some embodiments the potential misuse may be a type that could be unknown to an authorized user. In this case, the transit system could send a notification to the user alerting him/her to the possibility of fraud via text message, voice mail, email, telephone, traditional mail, and/or any other means of communication. A user preference may also be used to decide how to deal with potential misuse detected in the user's account. For instance, the user could specify that a notification be sent to the user. Notification could also be sent to the issuing bank in cases where the handheld media is a payment card. The user could also specify that more immediate action be taken to prevent further misuse and protect the user's account and the transit system 100.

In some embodiments, immediate action could include taking steps to restrict the use of the transit product, or to restrict the use of any handheld media with PANs 314 associated with the transit product. In one embodiment, the PAN 314 could be "hotlisted" to restrict the use of the associated handheld media at the access control points 208. This restriction could happen immediately when potential misuse is detected at the access control point 208, or the restricted PANs 314 could be sent our in batches periodically from the transit system 100. The restriction could prevent a PAN 314 from being used at all, including for any current transaction when potential misuse is detected. Alternatively, the restriction could allow any current transactions to proceed, but could restrict future transactions. The restriction could also be partial, allowing only a certain number of uses of the transit product during a time period. For example, a user account with a monthly transit pass could be restricted to ten uses per week, or to two uses per day.

In cases where the potential for misuse is less certain, the action taken may include manual inspection and/or further processing. For example, the times and locations associated with a PAN 314 may seem to indicate that although it would not be impossible for a single user to be using the PAN 314, it would be unlikely. In this case, the detection algorithm could flag the account as one possibly requiring more scrutiny. The travel patterns associated with the account could then be manually inspected by a human operator, or the travel patterns could be further analyzed by different types of detection methods to verify any potential misuse. If the further inspection or processing determines that the potential misuse is likely, then the account may be "hotlisted" as described above. Alternatively or additionally, the user and/or issuing bank institution could be notified. In one embodiment, a flagged account may collect more transaction identifiers from each subsequent transaction for processing. The detection algorithm could also use a larger subset of the transaction history or could compare the transaction identifiers with additional user profiles. It will be understood that other embodiments may use a combination of these and other techniques in taking an action after the detection of potential misuse.

In cases where it is determined that the user is allowing others to use his/her PAN 314 to access that transit system 100, either the transit system 100 or the user may specify that the additional uses be charged to the user account without restricting use of the card 310. For example, a user may swipe a payment card 310 multiple times at an access control point 208, allowing multiple users to enter the transit system 100 with his/her monthly pass. The first use of the card 310 could be allowed under the monthly pass, and each additional use could be charged to the user as an additional single-ride use. Charging for additional uses may result in a charge to the user account, or if the handheld media is a payment card 310, the additional charges may be charged directly to the payment card 310. Charging the payment card 310 in this manner may be the result of preference set by the user in the user account, and it may combined with other actions, such as restricting the PAN's 314 use or notifying the user.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Although many of the embodiments disclosed hereinabove use a contactless payment card 310, this is only one type of handheld media that is contemplated by this invention. It will be understood that many other types of handheld media may be used as a fare media 250, and that all of the embodiments described herein can utilize various forms of handheld media, in addition, and as an alternative to, contactless payment cards.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

What is claimed is:

1. A method for detecting potential misuse of a primary account number (PAN) associated with a handheld media in a transit system having one or more access points, the method comprising:
creating a user account for managing transactional information, the user account comprising a transit product;
enrolling the handheld media for use as fare media for the transit product, wherein the PAN is stored in the user account, wherein the handheld media is issued by an issuing party that is different than the transit system;
receiving, from the one or more access points of the transit system, a plurality of fare transaction records, wherein each fare transaction record in the plurality of fare transaction records comprises:
the PAN associated with the handheld media; and
a transaction counter;
determining, by the transit system, a potential misuse of a handheld media associated with the PAN, wherein the determination is based, at least in part, on:
a sequence of a plurality of transaction counters corresponding to the plurality of fare transaction records; and
a use profile that includes an expected gap in the sequence of the plurality of transaction counters, the expected gap representing non-fare transactions involving the issuing party, wherein the determining compares one or more gaps in the sequence of the plurality of transaction counters to the expected gap in the use profile; and
taking an action related to using the handheld media as fare media for using the transit product.

2. The method for detecting potential misuse of the PAN associated with the handheld media in the transit system having one or more access points of claim 1, wherein the handheld media is a smart card having near-field communication capabilities, wherein the transaction counter is stored on the handheld media, and wherein the transaction counter increments at least every time the handheld media is used at the one or more access points.

3. The method for detecting potential misuse of the PAN associated with the handheld media in the transit system having one or more access points of claim 1, wherein the potential misuse is determined by identifying gaps in the sequence of the plurality of transaction counters.

4. The method for detecting potential misuse of the PAN associated with the handheld media in the transit system having one or more access points of claim 1, wherein the potential misuse is determined by determining that the sequence of the plurality of transaction counters is not ascending.

5. The method for detecting potential misuse of the PAN associated with the handheld media in the transit system having one or more access points of claim 1, wherein the potential misuse is determined by comparing the sequence of the plurality of transaction counters to a user profile and identifying deviations.

6. The method for detecting potential misuse of the PAN associated with the handheld media in the transit system having one or more access points of claim 1, wherein:
each fare transaction record further comprises a transaction time and a transaction location; and
the potential misuse is further determined, at least in part, on a pattern of the transaction times and locations of a plurality of the transaction times and locations corresponding to the plurality of fare transaction records.

7. The method for detecting potential misuse of the PAN associated with the handheld media in the transit system having one or more access points of claim 6, wherein the potential misuse is determined by identifying a gap in the sequence of the plurality of transaction counters, wherein the gap is larger than a calculated amount based on a measured time interval.

8. The method for detecting potential misuse of the PAN associated with the handheld media in the transit system having one or more access points of claim 1, wherein:

the issuing party is not informed by the transit system of the fare transaction records; and the transit system is not informed by the issuing party of the expected uses of the handheld media in the transactions with the issuing party.

* * * * *

UNITED STATES PATENT AND TRADEMARK OFFICE
CERTIFICATE OF CORRECTION

| | | |
|---|---|---|
| PATENT NO. | : 8,856,024 B2 | |
| APPLICATION NO. | : 13/281272 | |
| DATED | : October 7, 2014 | |
| INVENTOR(S) | : Dixon et al. | |

It is certified that error appears in the above-identified patent and that said Letters Patent is hereby corrected as shown below:

In the Claims:

Column 26, line 9, please insert --a computer system of-- between "by" and "the transit".

Signed and Sealed this
Fourth Day of August, 2015

Michelle K. Lee
*Director of the United States Patent and Trademark Office*